US011577861B1

(12) United States Patent
Baghdasarian

(10) Patent No.: US 11,577,861 B1
(45) Date of Patent: Feb. 14, 2023

(54) STACKABLE SATELLITE DISPENSING CONFIGURATION

(71) Applicant: Maxar Space LLC, Palo Alto, CA (US)

(72) Inventor: Varouj Baghdasarian, Cupertino, CA (US)

(73) Assignee: Maxar Space LLC, Palo Alto, CA (US)

( * ) Notice: Subject to any disclaimer, the term of this patent is extended or adjusted under 35 U.S.C. 154(b) by 0 days.

(21) Appl. No.: 17/410,433

(22) Filed: Aug. 24, 2021

(51) Int. Cl.
*B64G 1/64* (2006.01)
*B64G 1/10* (2006.01)

(52) U.S. Cl.
CPC ............. *B64G 1/641* (2013.01); *B64G 1/10* (2013.01); *B64G 1/645* (2013.01); *B64G 2001/643* (2013.01)

(58) Field of Classification Search
CPC .... B64G 1/641; B64G 2001/643; B64G 1/10; B64G 1/645; B64G 1/22; B64G 1/64
See application file for complete search history.

(56) References Cited

U.S. PATENT DOCUMENTS

| | | | |
|---|---|---|---|
| 5,411,226 A * | 5/1995 | Jones | B64G 1/641 244/173.3 |
| 5,522,569 A * | 6/1996 | Steffy | B64G 1/222 244/172.6 |
| 5,613,653 A * | 3/1997 | Bombled | B64G 1/641 244/173.1 |
| 6,138,951 A * | 10/2000 | Budris | B64G 1/645 102/393 |
| 7,114,682 B1 | 10/2006 | Kistler et al. | |

(Continued)

FOREIGN PATENT DOCUMENTS

| | | |
|---|---|---|
| CN | 111332496 A | 6/2020 |
| EP | 3782914 A1 | 2/2021 |

OTHER PUBLICATIONS

International Search Report & The Written Opinion of the International Searching Authority dated Nov. 9, 2022, International Application No. PCT/US2022/039928.

(Continued)

*Primary Examiner* — Medhat Badawi
*Assistant Examiner* — Vicente Rodriguez
(74) *Attorney, Agent, or Firm* — Vierra Magen Marcus LLP

(57) ABSTRACT

Technology is disclosed for a spacecraft launch restraint and dispensing structure. Stacks of spacecrafts may be arranged around a central post. The dispensing structure has primary tie-down mechanisms that axially clamp the stacks of spacecrafts when in a stowed position. Each primary tie-down mechanism may have a rod located between two adjacent stacks, such that the rod tensions two stacks. In a deployment position, the primary tie-down rods extend away from the stack such that an ejection path is cleared. The dispensing structure also includes secondary tie-down mechanisms that radially connect the spacecrafts to the central post. After the primary tie-down rods are moved to the deployment position, the secondary tie-down mechanisms still hold the spacecrafts. The spacecrafts may be deployed by issuing control signals to the secondary tie-down mechanisms when the primary tie-down rods are in the deployment position.

20 Claims, 13 Drawing Sheets

(56) References Cited

U.S. PATENT DOCUMENTS

| | | | |
|---|---|---|---|
| 8,915,472 B2 | 12/2014 | Aston et al. | |
| 9,027,889 B2 | 5/2015 | Aston et al. | |
| 9,463,882 B1 * | 10/2016 | Field | B64G 1/645 |
| 9,718,566 B2 | 8/2017 | Field et al. | |
| 2002/0000495 A1 * | 1/2002 | Diverde | B64G 1/641 |
| | | | 244/137.1 |
| 2002/0179776 A1 * | 12/2002 | Mueller | B64G 1/1085 |
| | | | 244/158.5 |
| 2015/0028159 A1 | 1/2015 | Vichnin et al. | |
| 2017/0096240 A1 * | 4/2017 | Cook | B64G 1/64 |
| 2018/0290771 A1 * | 10/2018 | Chiang | B64G 1/645 |
| 2021/0122501 A1 | 4/2021 | Turner | |

OTHER PUBLICATIONS

English Abstract of Chinese Publication No. CN 111332496 published Jun. 26, 2020.

* cited by examiner

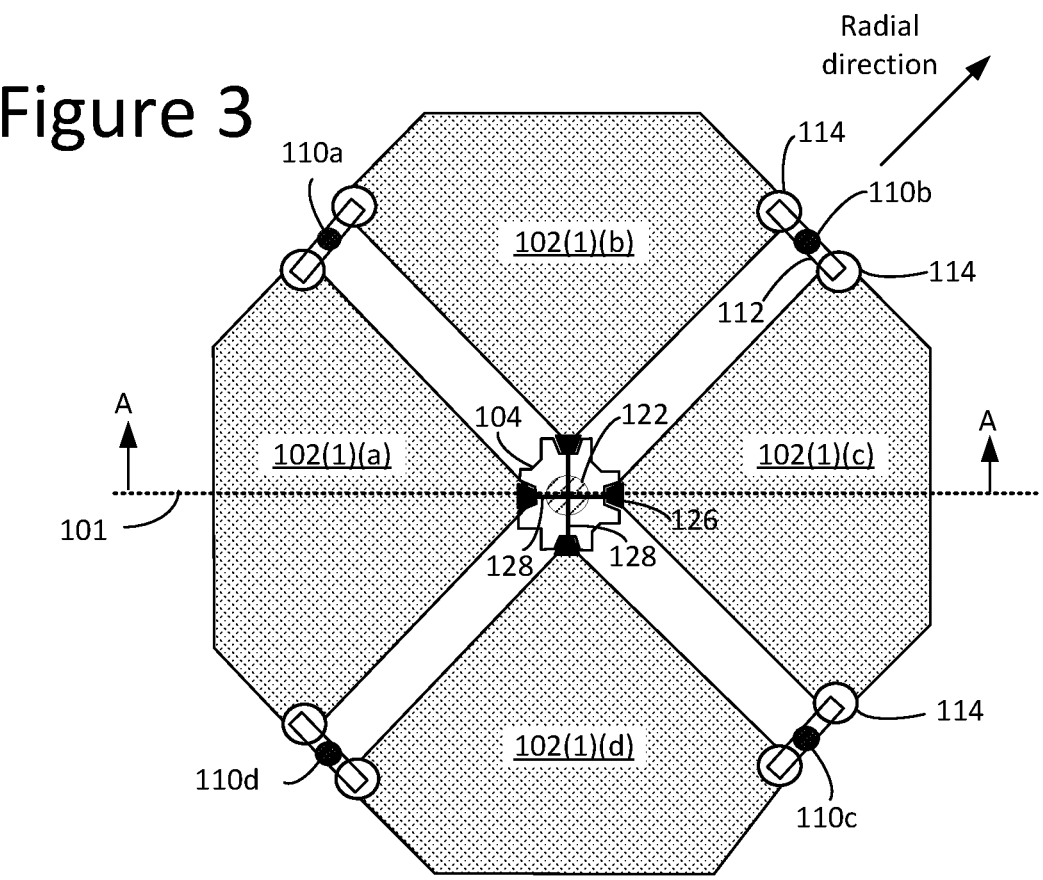
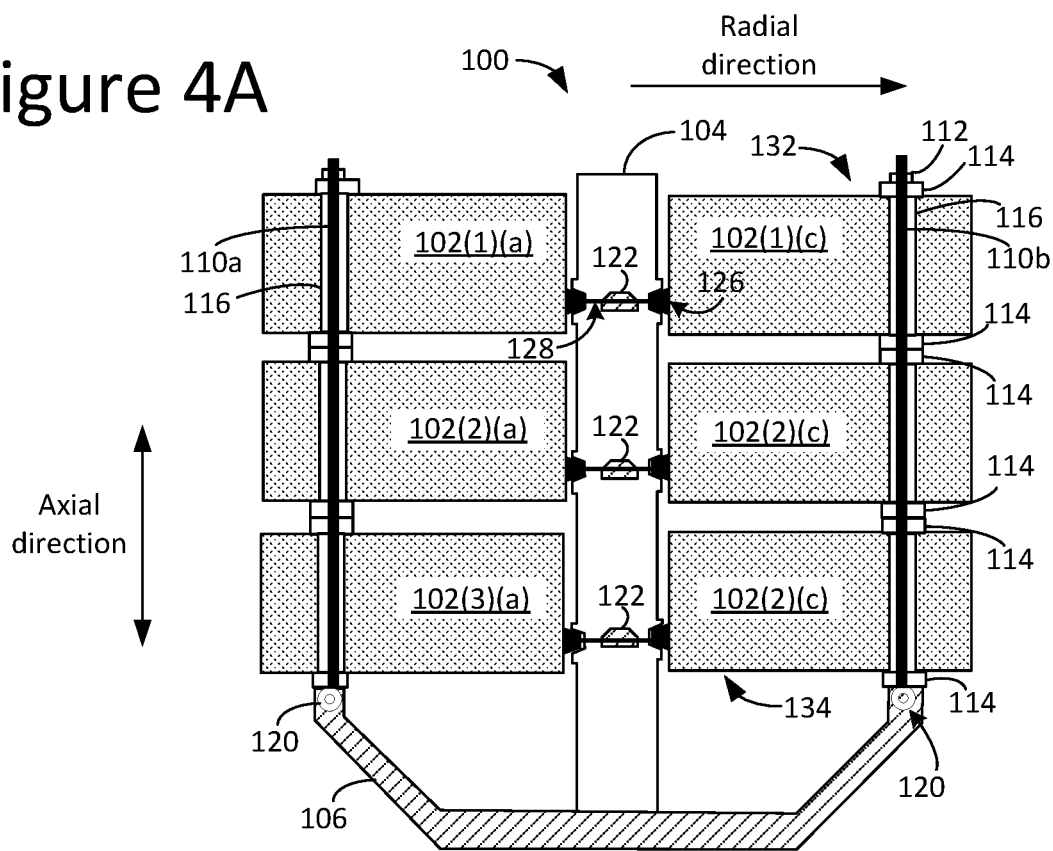

STACKABLE SATELLITE DISPENSING CONFIGURATION

BACKGROUND

The cost to launch spacecrafts such as satellites into orbit is extraordinarily expensive. The cost per satellite can be reduced by launching multiple satellites with one launch vehicle. Any additional mass adds considerably to the fuel cost. Thus, it is desirable to reduce the mass of the payload of the launch vehicle.

A satellite launch restraint and dispensing structure may be used to facilitate the launching of multiple satellites. The satellite launch restraint and dispensing structure typically connects to the launch vehicle. Once in orbit, the satellites may be dispensed from the restraint and dispensing structure. The satellites are sometimes oriented during launch one above another with respect to the gravitational force of the earth. Hence, the weight of the upper satellites needs to be supported either by satellites below and/or by the satellite launch restraint and dispensing structure. Because the satellite weight is equal to the mass times the gravitational acceleration, during launch the acceleration of the launch vehicle results a very high weight of the satellites.

However, the satellite launch restraint and dispensing structure must have adequate structural rigidity to support the satellites during launch. Also, during launch there are typically strong vibrations. Thus, it is challenging to design a satellite launch restraint and dispensing structure that has adequate structural rigidity and is low in mass.

Moreover, the satellite launch restraint and dispensing structure needs to be able to dispense the satellites once the launch vehicle is in orbit. Some conventional dispensing mechanisms are complex and add to the mass of the structure.

BRIEF DESCRIPTION OF THE DRAWINGS

FIG. 3 is a top view of an embodiment of the spacecraft launch restraint and dispensing structure.

FIG. 4A is a cross-sectional diagram of one embodiment of the spacecraft launch restraint and dispensing structure, and is consistent with the structure depicted in FIG. 3.

DETAILED DESCRIPTION

Technology is disclosed herein for supporting spacecrafts during launch and dispensing the spacecrafts into orbit. An embodiment includes a spacecraft launch restraint and dispensing structure that may be used with a number of stacks of satellites. In an embodiment, the stacks of spacecrafts are arranged around a central post. The dispensing structure may have a number of primary tie-down mechanisms that axially clamp the stacks of spacecrafts. Each primary tie-down mechanism may have a rod located between two adjacent stacks, such that the rod tensions two stacks. The primary tie-down rods have a stowed position and a deployment position. In the stowed position, each primary tie-down mechanism axially clamps the spacecrafts. In the deployment position, the primary tie-down rods extend away from the stack such that an ejection path is cleared. The dispensing structure also includes secondary tie-down mechanisms that may radially connect the spacecrafts to the central post. Immediately after the primary tie-down rods are moved from the stowed position to the deployment position, the secondary tie-down mechanisms will still hold the spacecrafts radially inward. The spacecrafts may be deployed by, for example, issuing control signals to the secondary tie-down mechanisms when the primary tie-down rods are in the deployment position. In an embodiment, the spacecrafts can be deployed in any desired sequence.

In an embodiment, each spacecraft has structural members that provide structural support when the primary tie-down rods are in the stowed position. This allows the bodies of the spacecrafts to be formed from lighter materials because the spacecraft body does not need to support the weight of other spacecrafts during launch.

Figure 1:
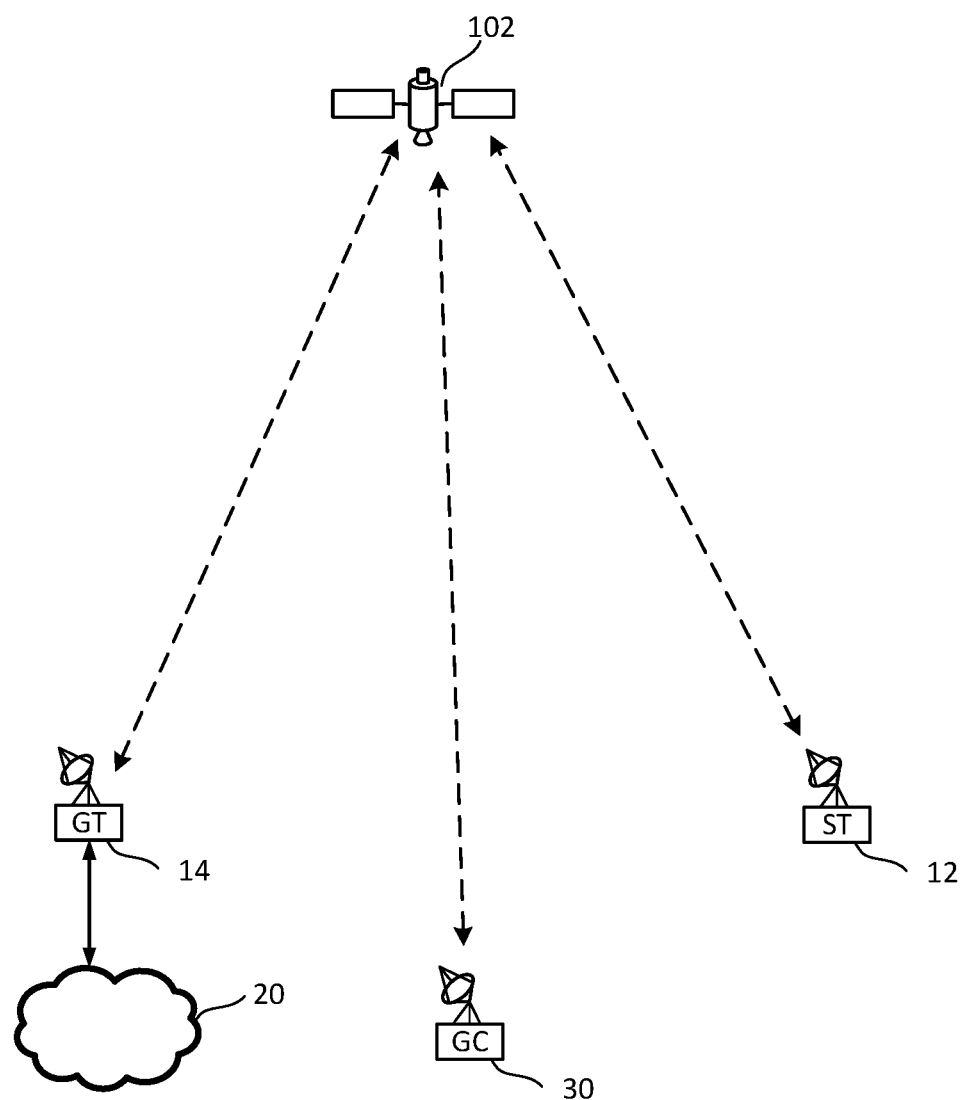
FIG. 1 is a block diagram of a spacecraft system.

FIG. 1 is a block diagram of a spacecraft system. The system of FIG. 1 includes spacecraft 102, subscriber terminal 12, gateway 14, and ground control terminal 30. Subscriber terminal 12, gateway 14, and ground control terminal 30 are examples of ground terminals. In one embodiment, spacecraft 102 is a satellite; however, spacecraft 102 can be other types of spacecrafts (e.g., shuttle, space station, interplanet traveling craft, rocket, etc.). Spacecraft 102 may be located, for example, at a geostationary or non-geostationary orbital location. Spacecraft 102 can also be a Low Earth Orbit satellite. Technology disclosed herein may be used for launching and dispensing the spacecraft 102 into orbit.

Spacecraft 102 is communicatively coupled by at least one wireless feeder link to at least one gateway terminal 12 and by at least one wireless user link to a plurality of subscriber terminals (e.g., subscriber terminal 12) via an antenna system. Gateway terminal 14 is connected to the Internet 20. The system allows spacecraft 102 to provide internet connectivity to a plurality of subscriber terminals (e.g., subscriber terminal 12) via gateway 14. Ground control terminal 30 is used to monitor and control operations of spacecraft 102. Spacecraft can vary greatly in size, structure, usage, and power requirements, but when reference is made to a specific embodiment for the spacecraft 102, the example of a communication satellite will often be used in the following, although the techniques are more widely applicable, including other or additional payloads such as for an optical satellite.

Figure 2A:
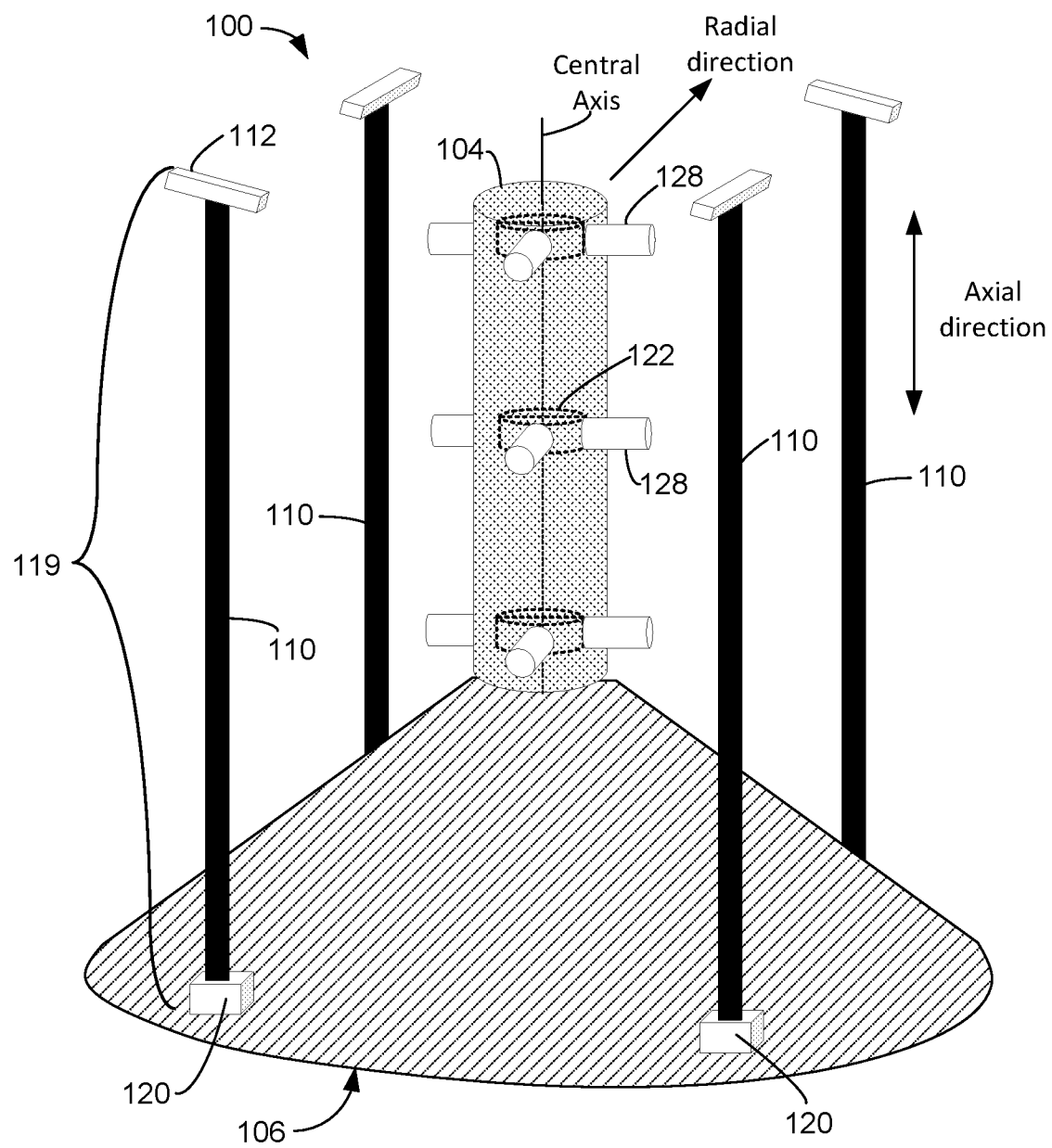
FIG. 2A is a perspective diagram of one embodiment of a spacecraft launch restraint and dispensing structure.

FIG. 2A is a perspective diagram of one embodiment of a spacecraft launch restraint and dispensing structure 100. For brevity, the spacecraft launch restraint and dispensing structure 100 may be referred to herein as a dispensing structure 100. The dispensing structure 100 may be used to provide structural support to stacks of spacecrafts and to dispense the spacecrafts into orbit. The spacecrafts are not depicted in FIG. 2A. In an embodiment, the spacecrafts are satellites. The dispensing structure 100 is lightweight, and has relatively few mechanical pieces.

The dispensing structure 100 has a number of primary tie-down mechanisms 119. Each primary tie-down mechanism 119 has a primary tie-down rod 110, a clamp 112, and a primary tie-down release mechanism 120. The primary tie-down mechanisms 119 are used to axially clamp the stacks of spacecrafts to the launch adaptor 106. The launch adaptor 106 is configured to be connected to a launch vehicle, such as a rocket. In general, the launch adaptor 106 is used to help carry the load from the dispensing structure 100 to the launch vehicle. The launch adaptor 106 may be formed from a lightweight material such as aluminum, titanium, or graphite. In the example of FIG. 2A, the launch adaptor 106 has a cone to which a central post 104 and the primary tie-down rods 110 are attached. The launch adaptor 106 may have a wide variety of shapes. Therefore, the shape of the launch adaptor 106 in FIG. 2A is an example to which the launch adaptor 106 is not limited.

The primary tie-down rods 110 are depicted in a hold down position, which is used to hold down the stacks of satellites in the axial direction. At the top of each primary tie-down rod 110 is a clamp 112, which is used to hold down two adjacent stacks of satellites in the axial direction. The clamp 112 may include a bar shaped piece of metal that extends over the edges of the top spacecrafts of the two adjacent stacks, as well as a nut or the like that may attach to the end of a primary tie-down rod 110. The nut may be tensioned down to achieve the desired tension. The satellites are not depicted in FIG. 2A. FIG. 2A depicts an example having four primary tie-down mechanisms 119, which are used to clamp four stacks of spacecrafts. In general, there are two or more primary tie-down mechanisms 119 in the structure 100. In some embodiments, the number of primary tie-down mechanisms 119 is equal to the number of stacks of spacecrafts, with each stack being located between two adjacent primary tie-down rod 110.

At the bottom of each primary tie-down rod 110 is a primary tie-down release mechanism 120. The primary tie-down release mechanism 120 is used to release the primary tie-down rod 110 from the hold down position to a deployment position (see FIGS. 5 and 10). In the deployment position, the primary tie-down rods 110 extends away from the stacks of spacecrafts to allow spacecrafts in to be released in the radial direction.

In the embodiment of FIG. 2A, the dispensing structure 100 has a central post 104, which is connected to the launch adaptor 106. The central post 104 is aligned with a central axis. Attached to the central post 104 are a number of secondary tie-down mechanisms. Each secondary tie-down mechanism includes one or more secondary tie-down release mechanisms 122, and a number of secondary tie-down rods 128. The secondary tie-down rods 128 are used to hold the satellites around the central axis. FIG. 2A depicts nine secondary tie-down rods 128, each of which can be used to hold a spacecraft. There may be additional secondary tie-down rods 128 on the back side of the central post 104; however, those secondary tie-down rods are not depicted in FIG. 2A. Thus, the dispensing structure 100 depicted in FIG. 2A may be used to hold 12 satellites.

A number of secondary tie-down release mechanisms 122 are depicted in FIG. 2A. The secondary tie-down release mechanisms (or actuators) 122 are used to release (or dispense) the satellites in the radial direction. In an embodiment, each secondary tie-down release mechanism 122 is an electro-mechanical device that may be commanded by a signal from, for example, a micro-processor. In an embodiment, the secondary tie-down release mechanism 122 is a low-shock release mechanism, such that the release does not damage electronics in the satellites 102. In some embodiments, a single secondary tie-down release mechanism 122 may be used to release two spacecrafts simultaneously. As one example, the central tie-down rod 128 may include a Frangibolt® and the release mechanism 122 may include a shape memory actuator used to break the Frangibolt®. However, the central tie-down mechanism is not required to use either a Frangibolt® or a shape memory actuator.

The dispensing structure 100 may be used for more or fewer than three levels of spacecrafts, in which case there would be more or fewer than three levels of secondary tie-down release mechanisms 122, as well as more or fewer than three levels of secondary tie-down rods 128. The dispensing structure 100 may be used for more or fewer than four satellites at each level, in which case there would be more or fewer than four primary tie-down rods 110. Also, there may be more or fewer than four secondary tie-down rods 128 at each level.

In an embodiment, the central post 104 is a structural element that provides structural support for the satellites. Herein the term "structural post" or the like used in connection with the central post means that the central post 104 bears a load from the satellites 102. In other words, a structural central post will carry much of the weight of the satellites 102. Example materials for the central post 104 include, but are not limited to, aluminum, titanium and graphite. In some embodiments, there is a non-structural element aligned with the central axis, as an alternative to the structural central post 104. The non-structural element may allow attachments of elements such as the secondary tie-down release mechanisms 122. However, the non-structural element need not provide structural support for the satellites. In other words, a non-structural central element does not bear a load from the satellites 102.

Herein, the term "apparatus" as used herein may refer to, but is not limited to, any combination of the dispensing structure 100 with or without the launch adaptor 106, the dispensing structure 100 with or without satellites 102, the dispensing structure 100 with or without a controller (e.g., micro-processor) to control the structure 100.

Figure 2B:
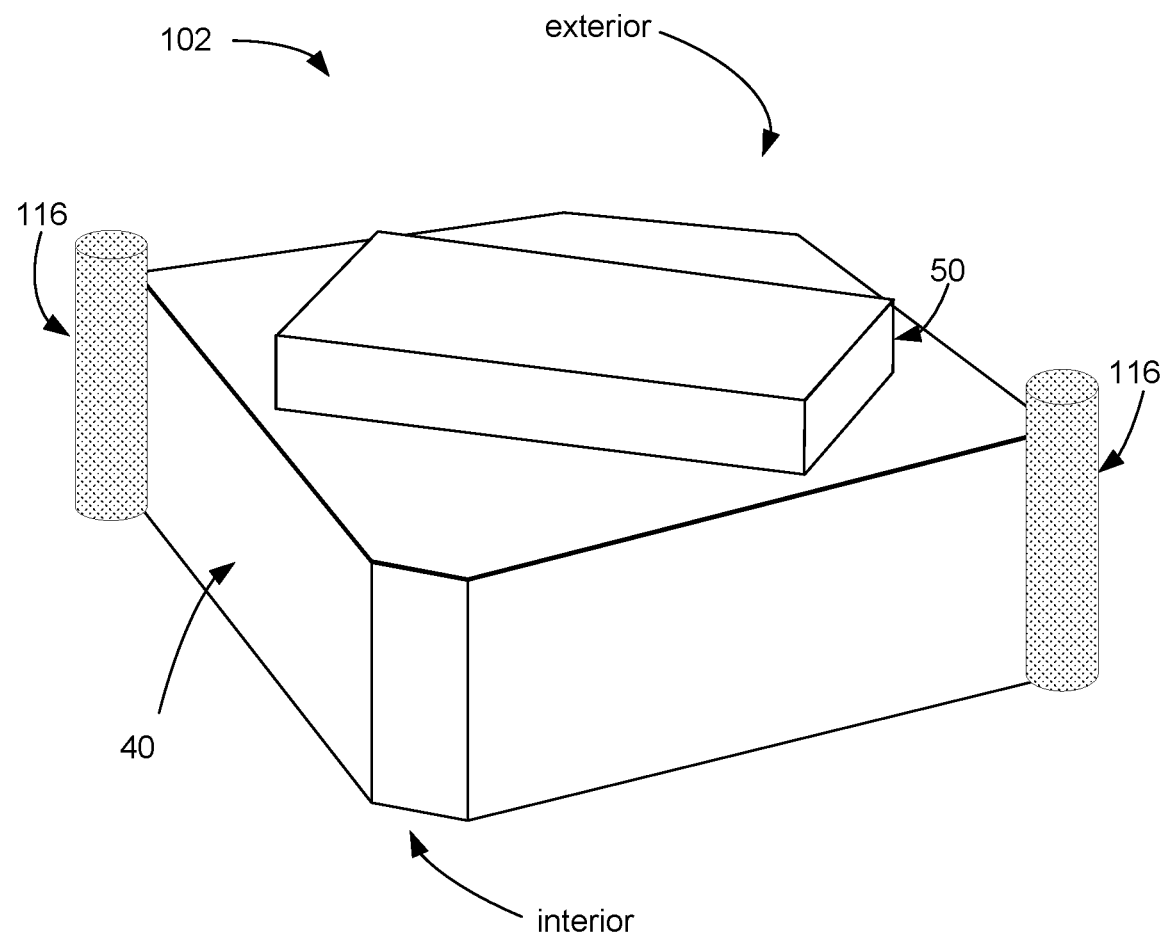
FIG. 2B is a diagram of one embodiment of a spacecraft.

FIG. 2B is a perspective view of one embodiment of a spacecraft 102. The dispensing structure 100 of FIG. 2A may be used to support and dispense a number of such spacecrafts. The spacecraft 102 may be a satellite. The spacecraft 102 has a body 40, a payload 50, and structural members 116. FIG. 2B points to what is referred to as an interior and an exterior. The interior refers to the side of the spacecraft that is adjacent to the central structure 104. The exterior refers to the side of the spacecraft that is adjacent to the primary tie-down rods 110. The body 40 houses electronics. The payload 50 may house solar cells, antennas, earth-observing equipment, remote-sensors, etc. The spacecraft 102 may have many different shapes. The spacecraft 102 may have many different shapes. Therefore, the shape depicted in FIG. 2B is one example.

The structural members 116 may be formed from, for example, aluminum or graphite. A structural member 116 may, for example, have the shape of a bar or tube. The structural member 116 allows the primary tie-down mechanisms 119 to clamp down the stack of satellites 102 without damaging (e.g., compressing) the satellites 102. Herein the term "structural" or "structural support" in connection with members 116 means that the member 116 will support a load (or a weight) of a spacecraft (e.g., the weight of one or more spacecraft above the spacecraft having the member 116). As noted, the spacecraft 102 may be used in structure 100, in which some of the spacecrafts are below others during launch. However, the bodies 40 of the lower spacecrafts 102 are not required to bear the weight of upper spacecrafts 102, thereby allowing the body 40 to be formed from lighter materials than if the body 40 needed to support the weight of another spacecraft 102. Rather, the structural members 116 bear the weight of other spacecrafts 102. The body 40 may be made of a lightweight material such as aluminum, titanium, graphite, etc.

Figure 2C:
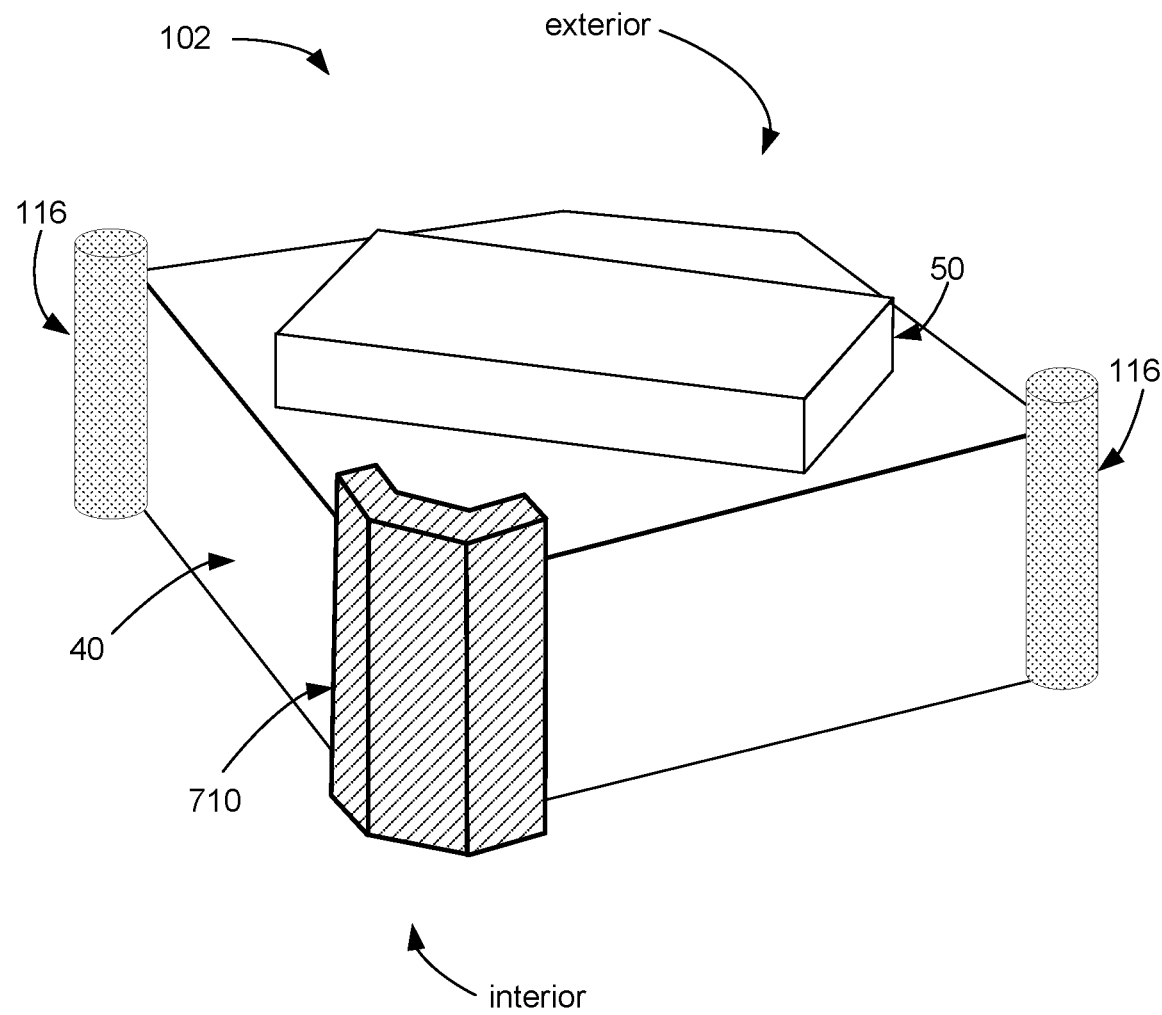
FIG. 2C is a perspective view of another embodiment of a spacecraft.

FIG. 2C is a perspective view of one embodiment of a spacecraft 102. The dispensing structure 100 of FIG. 2A may be used to support and dispense a number of such spacecrafts. The spacecraft 102 may be a satellite. The spacecraft 102 is similar to the one depicted in FIG. 2B, but adds a rigid cone 710. The rigid cone 710 may be formed from, for example, aluminum, titanium, or graphite. In some embodiments, the rigid cones 710 of multiple spacecrafts are tied together (by, for example, secondary tie-down rods 128) to form a rigid structure. Further details embodiments in which spacecrafts have rigid cone 710 are described below in connection with FIGS. 7-10.

FIG. 3 is a top view of an embodiment of the spacecraft launch restraint and dispensing structure 100. The top view of FIG. 3 shows four satellites 102(1)(a), 102(1)(b), 102(1)(c), and 102(1)(d) on the top level of stacks of satellites. A middle level and a lower level may also have four satellites. The reference numeral 102 will be used herein to refer to a satellite in general, without reference to a specific satellite. FIG. 4A is a cross-sectional diagram of one embodiment of the spacecraft launch restraint and dispensing structure 100, and is consistent with the structure depicted in FIG. 3. FIG. 4A shows a view from along line 101 in FIG. 3, looking in the direction of arrows labeled A. FIG. 4A shows two stacks of satellites, each having three satellites 102. Specifically, FIG. 4A shows a first stack having satellites 102(1)(a), 102(2)(a), and 102(3)(a). FIG. 4A shows a second stack having satellites 102(1)(c), 102(2)(c), and 102(3)(c). The configuration depicted in FIGS. 3 and 4A has four stacks of satellites; however, the two other stacks of satellites are not depicted in FIG. 4A.

The dispensing structure 100 allows for a stacked configuration of satellites. A stacked configuration of satellites means that one satellite is stacked above another, although the bodies 40 of the satellites do not necessarily touch one another. In the example of FIGS. 3 and 4, there are four stacks of satellites, with each stack having three satellites. In general, there are two or more satellites 102 per level. Thus, in general, there are two or more stacks of satellites.

The dispensing structure 100 has four primary tie-down rods 110a, 110b, 110c, 110d. The reference numeral 110 will be used herein to refer to a primary tie-down rod in general, without reference to a specific primary tie-down rod. There is a clamp 112 at the top of each primary tie-down rod 110. The primary tie-down rods 110 are used to clamp the satellites in a stack together in the axial direction. Each primary tie-down rod 110 resides between two adjacent stacks of satellites 102. Each primary tie-down rod 110 extends between a top 132 of a stack and a bottom 134 of a stack. The primary tie-down rods 110 also connect to and hold the stacks of satellites to the launch adaptor 106. In an embodiment, each primary tie-down rod 110 when in the stowed position is configured to pre-tension the structural members 116 of two stacks of the spacecrafts. In an embodiment, the primary tie-down rods 110 are formed from a material that is typically used for tensioning structures. In an embodiment, the primary tie-down rods 110 are formed from a metal, such as steel or titanium.

For example, primary tie-down rods 110a and 110d axially hold together the stack having satellites 102(1)(a), 102(2)(a), and 102(3)(a); primary tie-down rods 110b and 110c axially hold together the stack having satellites 102(1)(c), 102(2)(c), and 102(3)(c). Likewise, primary tie-down rods 110c and 110d axially hold together the stack having satellite 102(1)(d) and two other satellites not depicted in FIG. 3 or 4; and primary tie-down rods 110a and 110b axially hold together the stack having satellite 102(1)(b) and two other satellites not depicted in FIG. 3 or 4.

Moreover, FIG. 4A shows that primary tie-down rod 110a clamps the stack having satellites 102(1)(a), 102(2)(a), and 102(3)(a) to the launch adaptor 106. In a similar manner, primary tie-down rod 110d clamps the stack having satellites 102(1)(a), 102(2)(a), and 102(3)(a) to the launch adaptor 106; however, this is not depicted in FIG. 4A. FIG. 4A shows that primary tie-down rod 110b clamps the stack having satellites 102(1)(c), 102(2)(c), and 102(3)(c) to the launch adaptor 106. In a similar manner, primary tie-down rod 110c clamps the stack having satellites 102(1)(c),102(2)(c), and 102(3)(c) to the launch adaptor 106; however, this is not depicted in FIG. 4A. In an analogous manner, primary tie-down rods 110c and 110d clamp the stack having satellite 102(1)(d) and two other satellites to the launch adaptor 106; however, this is not depicted in FIG. 4A. In an analogous manner, primary tie-down rods 110a and 110b clamp the stack having satellites 102(1)(b) and two other satellites to the launch adaptor 106; however, this is not depicted in FIG. 4A.

There is a primary tie-down release mechanism 120 at the bottom of each primary tie-down rod 110. The mechanism 120 is used to release the primary tie-down rod 110 and swing the rod 110 such that the rod 110 is out of the way of an ejection path in order to allow satellites 102 to be dispensed. The primary tie-down release mechanism 120 will be discussed in further detail below.

Each satellite 102 has structural members 116, which co-inside with a primary tie-down rod 110. FIG. 4A shows one of the structural members 116 of each of the satellites 102. For example, a structural member 116 of satellite 102(1)(a) that co-insides with primary tie-down rod 110a is depicted in FIG. 4A. Satellite 102(1)(a) has another structural member 116 (not depicted in FIG. 4A) that co-insides with primary rod 110d. The structural member 116 is load bearing. The structural member 116 may be formed from, for example, aluminum or graphite. The structural member 116 may, for example, have the shape of a bar or tube. The structural member 116 allows the primary tie-down rods to clamp down the stack of satellites 102 without damaging (e.g., compressing) the satellites 102. Each satellite 102 a friction pad 114 above each structural member 116 and a friction pads 114 below each structural member 116.

The central post 104 connects to the launch adaptor 106. The satellites 102 are held to the central post 104 by secondary tie-down rods 128. FIG. 3 depicts two secondary tie-down rods 128 at the top level. The middle and lower levels may also each have two secondary tie-down rods 128. The secondary tie-down rods 128 will hold the satellites 102 after the primary tie-down rods 110 are configured into the ejection position when the satellites are ready to be dispensed. In an embodiment, a secondary tie-down rod 128 is bolted to a satellite 102.

A secondary tie-down release mechanism 122 controls the ejection of satellites 102 in the radial direction. The secondary tie-down release mechanism 122 may be an electromechanical device. In an embodiment, electrical signals are sent to the secondary tie-down release mechanisms 122 to control the ejection of the satellites 102. As one example, the central tie-down rod 128 may include a Frangibolt® and the release mechanism 122 may include a shape memory actuator used to break the Frangibolt®. However, the central tie-down mechanism is not required to use either a Frangibolt® or a shape memory actuator.

Figure 4B:
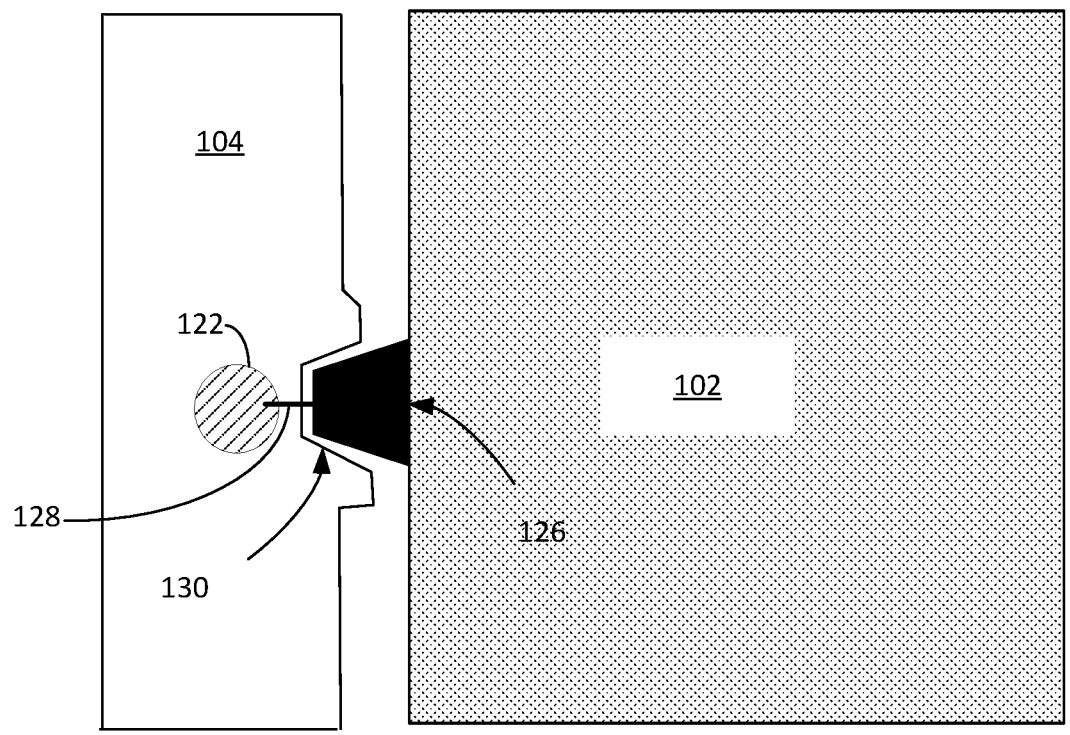
FIG. 4B depicts a close up view of the cup/cone interface shown in FIG. 4A.

Each satellite 102 has a cone 126, which forms part of the interface to the central post 104. The central post 104 has a number of cups, each of each is used to receive a cone 126. FIG. 4B depicts a close up view of the cup/cone interface. FIG. 4B depicts a cup 130 on the central post 104. The cone 126 is attached to the satellite 102. The cup 130 receives the cone 126. The secondary tie down rod 128 may be used to radially tie the satellite 102 to the central post 104.

The central post 104 may be formed from, for example, aluminum, titanium, or graphite. In general, the central post 104 may be formed from a light and strong material. In an embodiment, the central post 104 is hollow. Hence, the central post 104 could have the general shape of a hollow tube. However, the central post 104 could also have a truss structure.

As noted above, typically there are strong vibrations during launch. The dispensing structure 100 holds the satellites together such that the satellites do not rock and do not separate from each other during launch vibrations.

Figure 5:
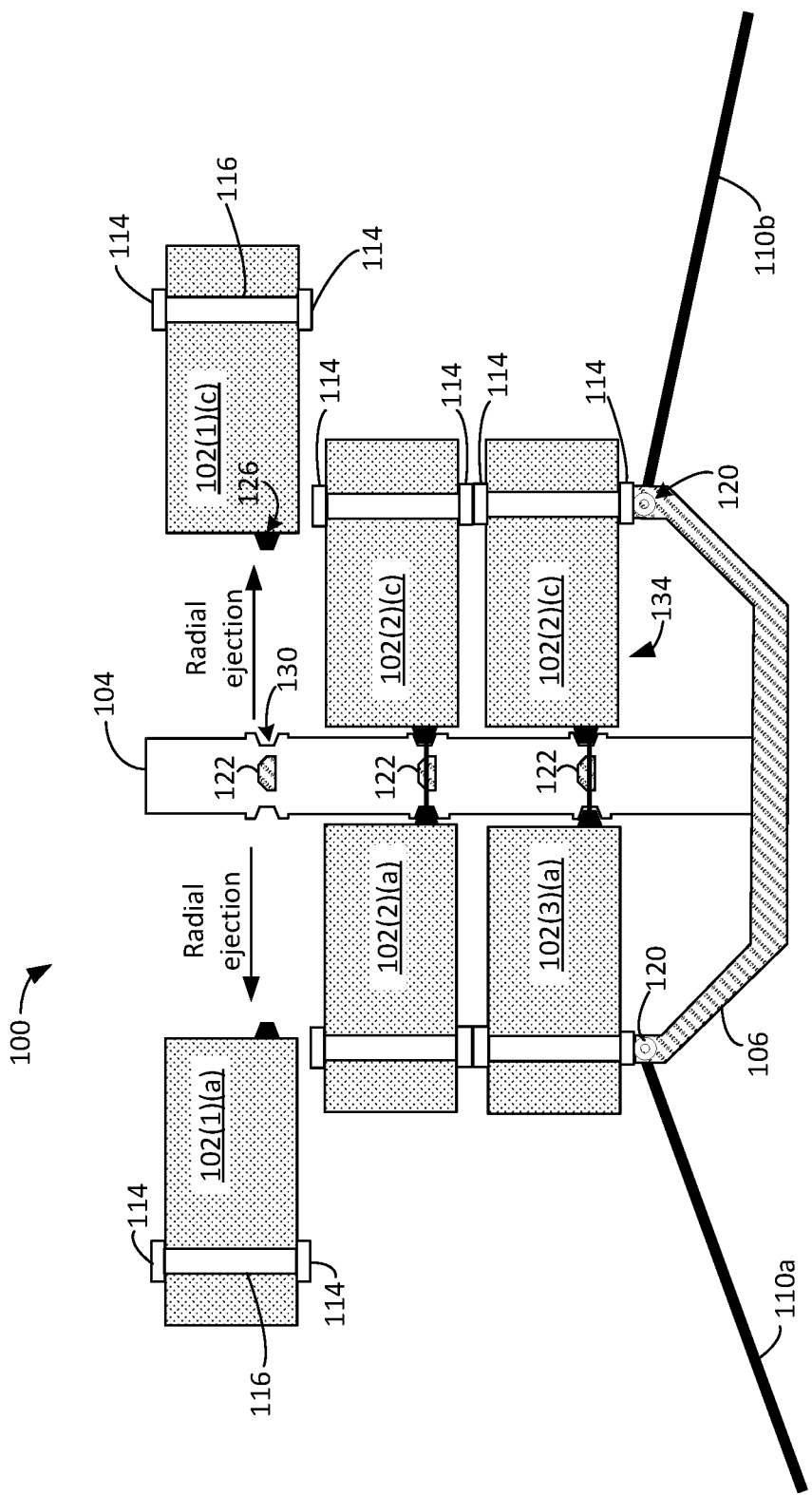
FIG. 5 depicts the same dispensing structure as in FIG. 4A, but with the primary tie-down rods in a deployment position.
Figure 6:
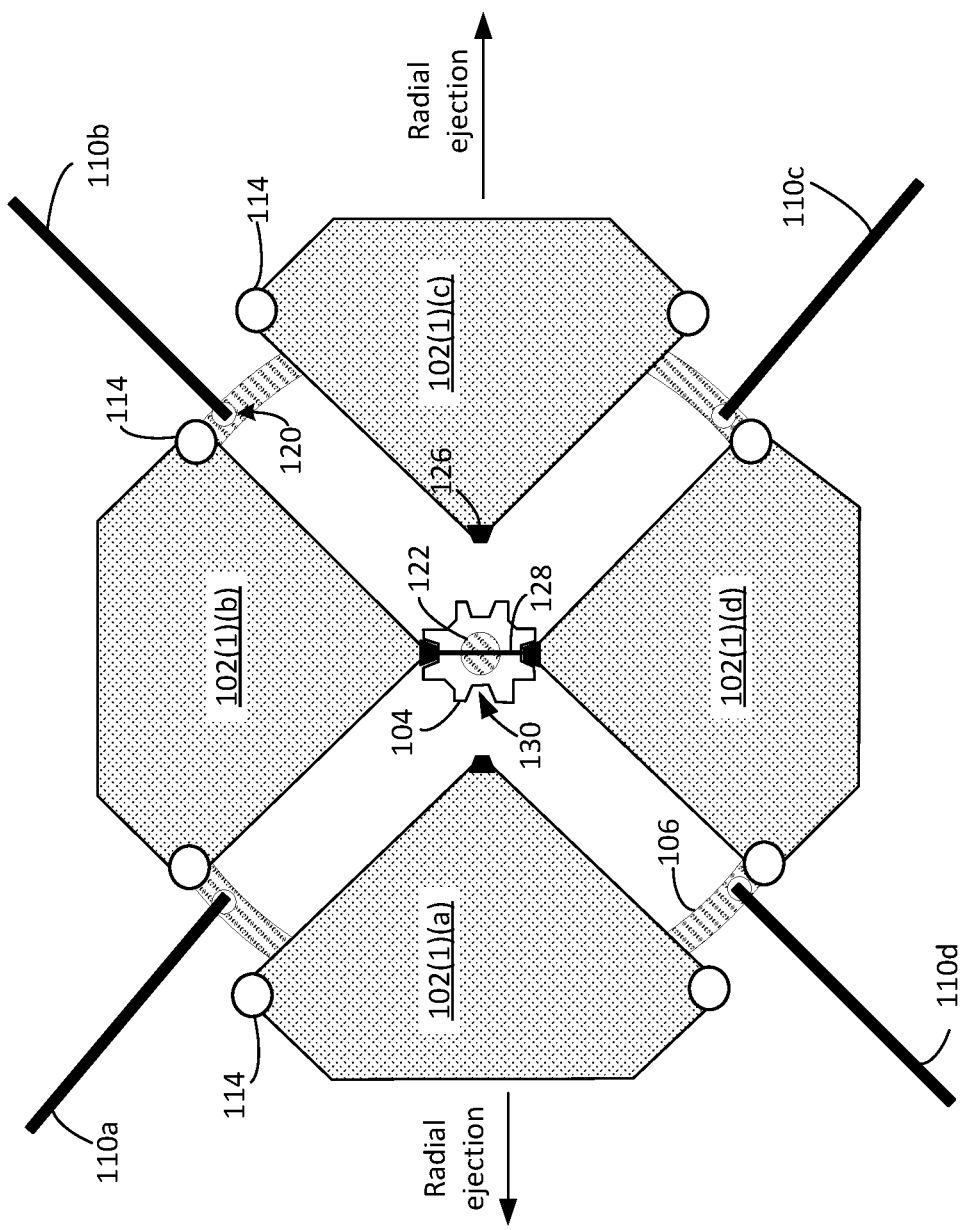
FIG. 6 depicts a top view of the structure in which all of the primary tie-down rods are moved to the deployment position.

FIG. 5 depicts the same dispensing structure 100 as in FIG. 4A. However, in FIG. 5, primary tie-down rods 110a, 110b are in now in a deployment position. The other primary tie-down rods 110c, 110d are not depicted in FIG. 5, but are also in the deployment position in order to allow the ejection of the satellites. FIG. 6 depicts a top view of the dispensing structure 100 in which all four of the primary tie-down rods 110a, 110b, 110c, and 110d are moved to the deployment position. That is, all rods 110 are in the deployment position shown for primary tie-down rods 110a, 110b in FIG. 5.

The primary tie-down release mechanisms 120 are configured to move the primary tie-down rods 110 into the deployment position. In an embodiment, a primary tie-down release mechanism 120 is controlled by an electrical signal in order to control the position of the corresponding primary tie-down rod 110. When in the deployment position, the primary tie-down rods 110 are out of an ejection path to permit respective satellites in the stacks to be ejected in the radial direction.

After the aforementioned primary tie-down rods 110 are moved to the deployment position the secondary tie-downs 128 continue to hold the satellites in place. The secondary tie-down release mechanisms 122 control the ejection of satellites 102 in the radial direction. Hence, the satellites in the stack may be released in a desired order. For example, the satellites in the stack may be released in a top to bottom order.

In one embodiment, first all four of the primary tie-down rods 110a, 110b, 110c, and 110d are moved to the deployment position. Then, the secondary tie-down release mechanisms 122 are controlled to eject the satellites in a desired order. In one embodiment, pairs of satellites in stacks at the opposite side of the structure are ejected simultaneously. For example, satellite 102(1)(a) and 102(1)(c) may be ejected simultaneously.

Referring to FIG. 6, the primary tie-down rods 110a, 110b, 110c, and 110d are depicted as still being connected to the launch adaptor 106. The four satellites 102(1)(a,b,c,d) at the top level are depicted. Satellites 102(1)(a) and 102(1)(c) are being ejected in the radial direction. Satellites 102(1)(b) and 102(1)(b) are still held to the central post 104 by a secondary tie-downs 128. The friction pads 114 and the cone 126 may stay affixed to the respective satellites after they have been radially ejected. Also, with reference to FIG. 5, the structural members 116 may stay attached to the satellites 102 after the satellites have been ejected.

Figure 7:
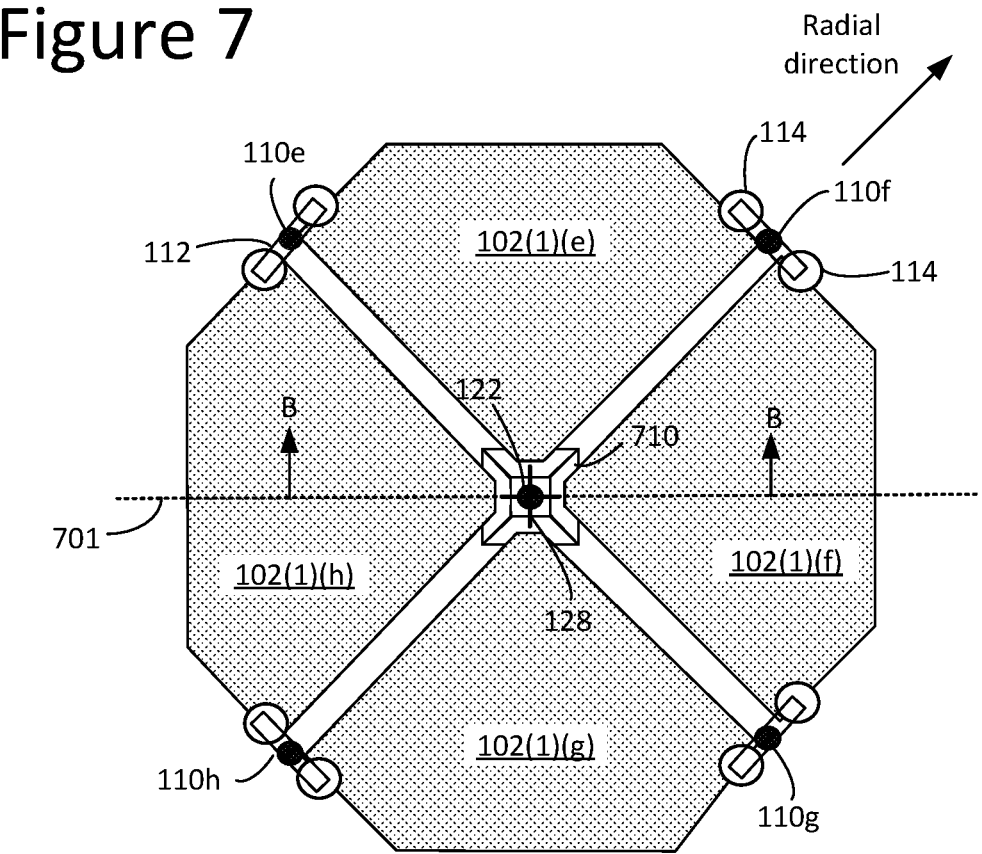
FIG. 7 and FIG. 8 depict an embodiment of a spacecraft launch restraint and dispensing structure in which there is not a structural central post.
Figure 8:
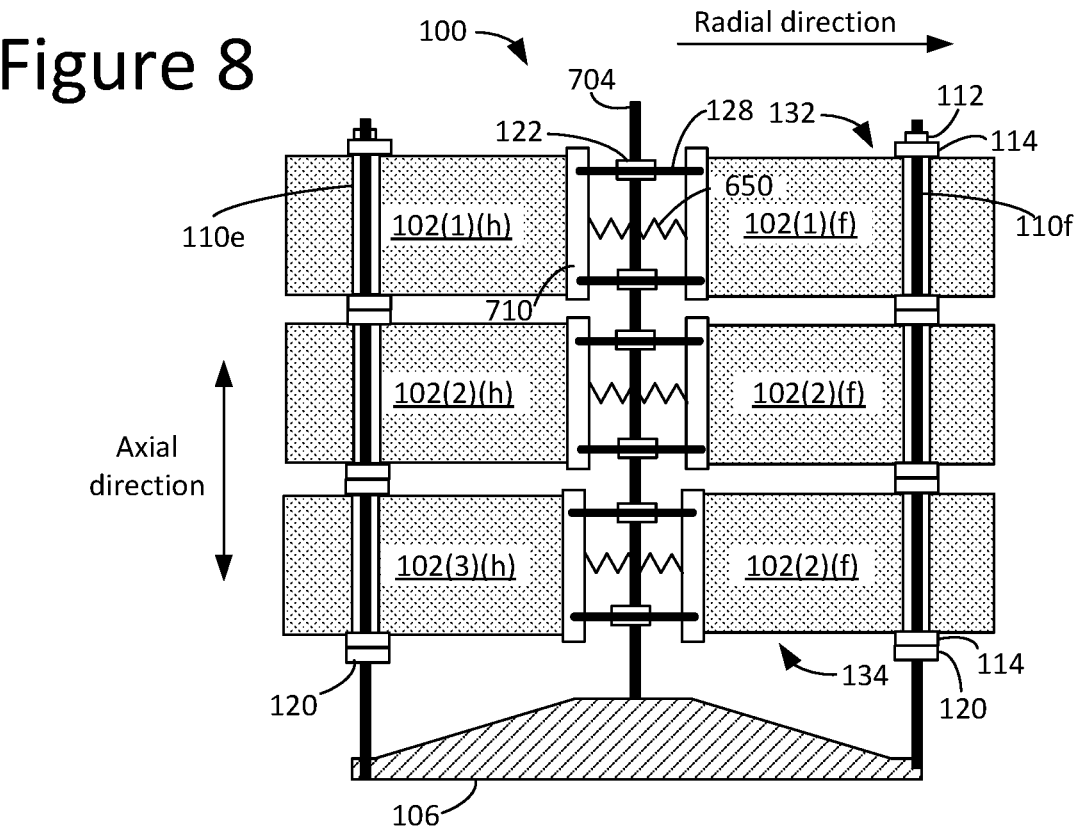

FIG. 7 and FIG. 8 depict an embodiment of a dispensing structure 100 in which there is not a structural central post. Eliminating a structural central post saves mass and, therefore, saves on launch cost. FIG. 7 depicts a top view of the dispensing structure 100 and four satellites 102(1)(e), 102(1)(f), 102(1)(g), 102(1)(h) at the top level. FIG. 8 depicts a side view of the dispensing structure 100 and two of the four stacks of satellites. FIG. 8 shows a view along line 701 in FIG. 7, looking in the direction of the arrows labeled B. Specifically, FIG. 8 shows a first stack having satellites 102(1)(h), 102(2)(h), and 102(3)(h), and a second stack having satellites 102(1)(f), 102(2)(f), and 102(3)(f). Two stacks of the satellites are not depicted in FIG. 8 so as to better illustrate details of this embodiment.

As noted, the top view of FIG. 7 shows four satellites 102(1)(e), 102(1)(f), 102(1)(g), and 102(1)(h) on the top level. The middle level and the lower level may also have four satellites. In the example of FIGS. 7 and 8, there are four stacks of satellites, with each stack having three satellites.

The dispensing structure 100 has four primary tie-down rods 110e, 110f, 110g, 110h. There is a clamp 112 at the top of each primary tie-down rod 110. The primary tie-down rods 110 are used to clamp the satellites in a stack together in the axial direction. Each primary tie-down rod 110 resides between two adjacent stacks of satellites 102. Each primary tie-down rod 110 extends between a top 132 of a stack and a bottom 134 of a stack. The primary tie-down rods 110 also connect and hold the stacks of satellites to the launch adaptor 106.

For example, primary tie-down rods 110e and 110h axially hold together the stack having satellites 102(1)(h), 102(2)(h), and 102(3)(h); primary tie-down rods 110f and 110g axially hold together the stack having satellites 102(1)(f), 102(2)(f), and 102(3)(f). Likewise, primary tie-down rods 110g and 110h axially hold together the stack having satellite 102(1)(g) and two other satellites not depicted in FIG. 7 or 8; and primary tie-down rods 110e and 110f axially hold together the stack having satellite 102(1)(e) and two other satellites not depicted in FIG. 7 or 8.

Moreover, FIG. 8 shows that primary tie-down rod 110e clamps the stack having satellites 102(1)(h), 102(2)(h), and 102(3)(h) to the launch adaptor 106. In a similar manner, primary tie-down rod 110h clamps the stack having satellites 102(1)(h), 102(2)(h), and 102(3)(h) to the launch adaptor 106; however, this is not depicted in FIG. 8. FIG. 8 shows that primary tie-down rod 110f clamps the stack having satellites 102(1)(f), 102(2)(f), and 102(3)(f) to the launch adaptor 106. In a similar manner, primary tie-down rod 110g clamps the stack having satellite 102(1)(f), 102(2)(f), and 102(3)(*f*) to the launch adaptor 106; however, this is not depicted in FIG. 8. In an analogous manner, primary tie-down rods 110*g* and 110*h* clamp the stack having satellites 102(1)(*g*) and two other satellites to the launch adaptor 106; however, this is not depicted in FIG. 8. In an analogous manner, primary tie-down rods 110*e* and 110*f* clamp the stack having satellites 102(1)(*e*) and two other satellites to the launch adaptor 106; however, this is not depicted in FIG. 8.

There is a primary tie-down release mechanism 120 at the bottom of each primary tie-down rod 110. The mechanism 120 is used to release the rod 110 and swing the rod 110 such that the rod 110 is out of the way of an ejection path in order to allow satellites to be dispensed. The primary tie-down release mechanism 120 will be discussed in further detail below.

Each satellite 102 has a friction pad 114 above each structural member 116 and a friction pad 114 below each structural member 116. Each satellite has a rigid cone 710. The rigid cone 710 may be made of, for example, titanium, aluminum, graphite, or steel. In an embodiment, the rigid cone 710 is formed from load bearing or structural material. The top view of FIG. 7 depicts that the rigid cones 710 of the satellite 102 at the top level come together to form a rigid structure. One or more secondary tie-down rods 128 may be used to connect the satellites at the rigid cones 710 such that the spacecrafts at a level of the stack form a rigid structure. Thus, the rigid cones 710 of the spacecrafts 102 at a level of the stacks are configured to contact each other such that the spacecrafts at the respective level form a rigid structure. This allows the structural central post (see central post 104 in FIG. 3, 4) to be eliminated from the structure 100.

As noted, the dispensing structure 100 does not have a structural central post in this embodiment (see central post 104 in FIGS. 3, 4A). Instead, there is a non-structural post 704 along the central axis of the structure 100. The term "non-structural" as used herein in connection with the post 704 means that the post does not bear a load from the spacecrafts 102. In other words, a non-structural central post will not carry much, if any, of the weight of the satellites 102. This is in contrast with the structural post 104, which is configured to carry a significant weight of the spacecrafts 102. The non-structural post 704 supports element such as the secondary tie-down release mechanisms 122, and ejection springs 650. Each secondary tie-down release mechanisms 122 may include an electro-mechanical device that may be controlled by an electrical signal. In one embodiment, wires are run through the non-structural post 704 to send the control signals to the secondary tie-down release mechanisms 122.

The satellites 102 are held to each other along central axis by secondary tie-down rods 128. FIG. 8 depicts two secondary tie-down rods 128 connecting satellite 102(1)(*f*) and 102(1)(*h*). There may be a bolt or the like inside each satellite to secure the rod 128 to the satellite. Likewise, two secondary tie-down rods 128 connect satellite 102(2)(*f*) and 102(2)(*h*), and two secondary tie-down rods 128 connect satellite 102(3)(*f*) and 102(3)(*h*). Neither the other two stacks of satellites nor their connections are depicted in FIG. 8. From the top view depicted in FIG. 7, one of the secondary tie-down rods 128 can be seen holding together satellites 102(1)(*f*) and 102(1)(*h*). Likewise, one of the secondary tie-down rods 128 can be seen holding together satellites 102(1)(*e*) and 102(1)(*g*). The secondary tie-down rods 128 will hold the satellites 102 together after the primary tie-down rods 110 are configured into the ejection position when the satellites are ready to be dispensed. An ejection spring 650 is used to eject two satellites at a time.

Figure 9:
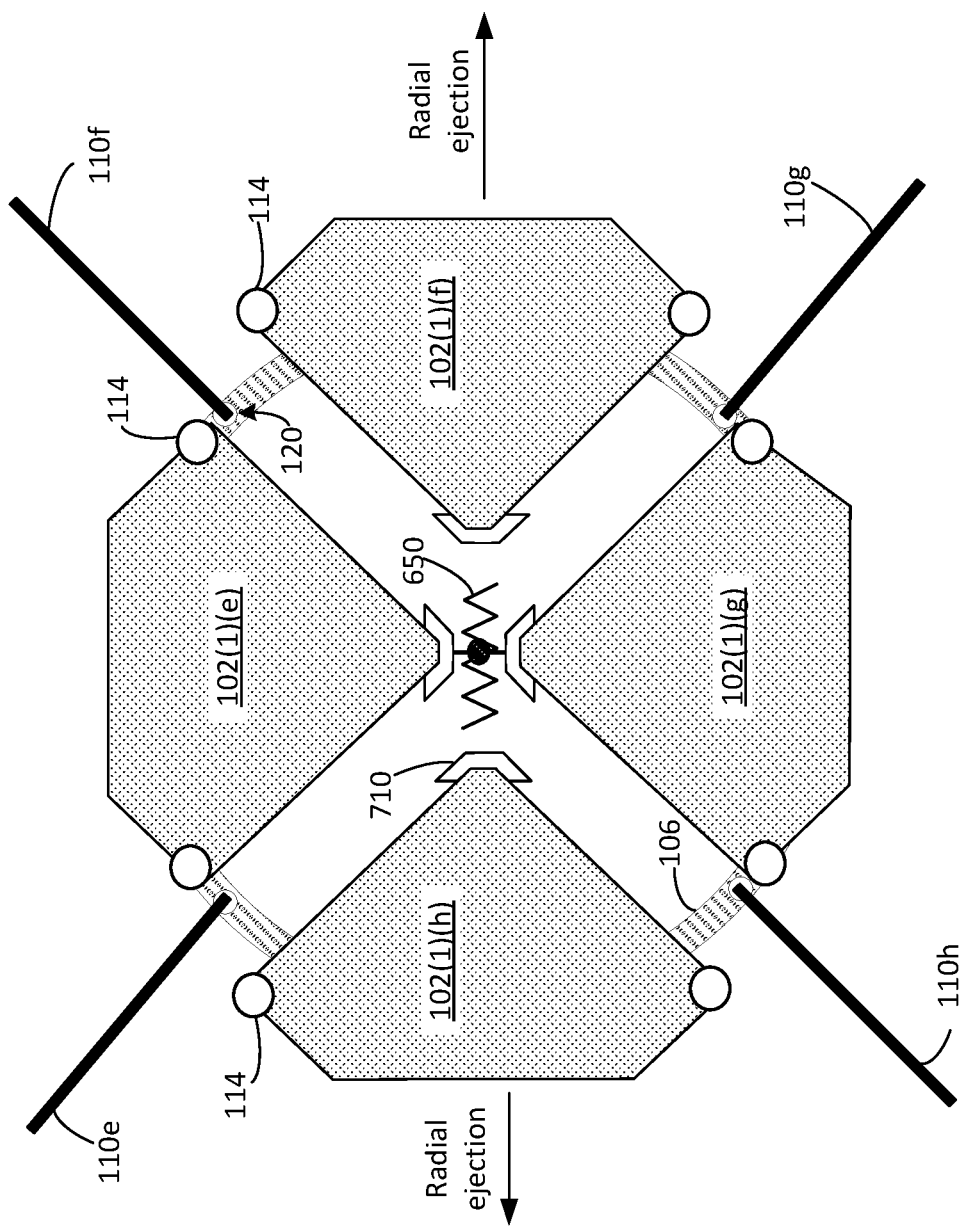
FIG. 9 depicts a top view of the structure from FIG. 7 in which all of the primary tie-down rods are moved to the deployment position.

FIG. 9 depicts a top view of the dispensing structure 100 from FIG. 7 in which all four of the primary tie-down rods 110*e*, 110*f*, 110*g*, and 110*h* are moved to the deployment position. The primary tie-down rods 110*e*, 110*f*, 110*g*, and 110*h* are depicted as still being connected to the launch adaptor 106. The four satellites 102(1)(*e,f,g,h*) at the top level are depicted. Satellites 102(1)(*f*) and 102(1)(*h*) are being ejected in the radial direction. The ejection spring 650 creates a force to eject the two satellites 102(1)(*f*) and 102(1)(*h*). Note that such ejection springs can also be used in connection with embodiments depicted in FIGS. 3-6. Referring again to FIG. 9, satellites 102(1)(*e*) and 102(1)(*g*) are still connected together by a secondary tie-downs 128 (only one of these secondary tie-downs is depicted in FIG. 9). The friction pads 114 and the rigid cone 710 may stay affixed to the respective satellites 102 after they have been radially ejected. The satellites at the lower levels are not depicted in FIG. 9 so as to not obscure the diagram.

Figure 10:
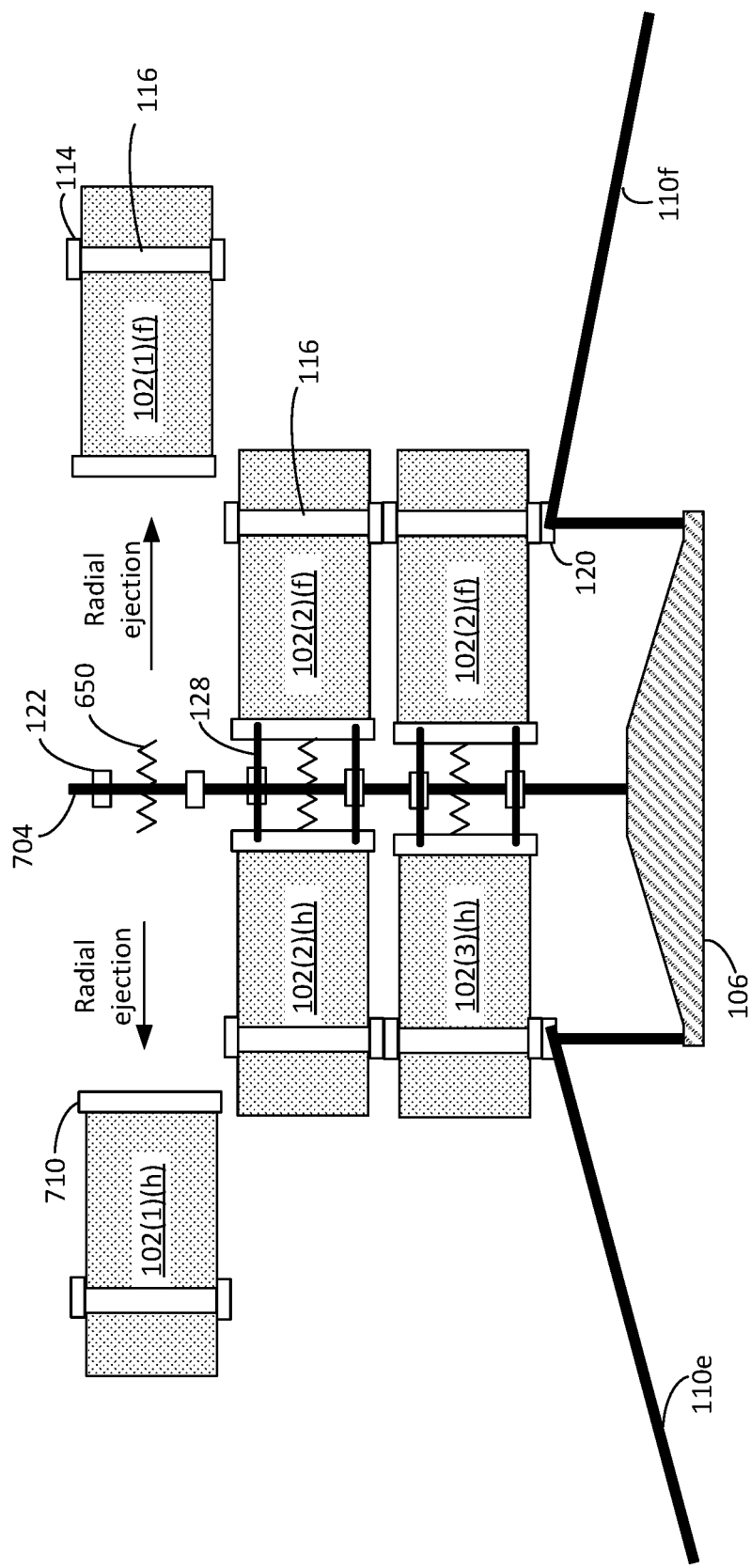
FIG. 10 depicts a side cross section of an embodiment of the spacecraft launch restraint and dispensing structure consistent with the view of FIG. 8.

FIG. 10 depicts a side cross section of the dispensing structure 100 consistent with the view of FIG. 8. However, the primary tie-down rods 110*e* and 110*f* are moved to the deployment position. FIG. 10 shows the example of FIG. 9 in which satellites 102(1)(*f*) and 102(1)(*h*) are being ejected in the radial direction. The structural members 116 may stay with the satellites 102 after they are deployed.

Figure 11:
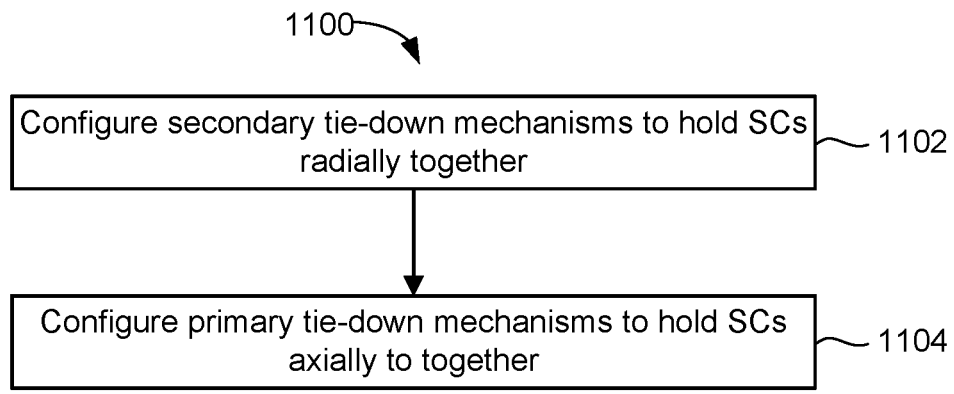
FIG. 11 is a flowchart of one embodiment of a process of configuring a stack of spacecrafts for launch.

FIG. 11 is a flowchart of one embodiment of a process 1100 of configuring a stack of spacecrafts for launch. The process will be explained with reference to the various embodiments of spacecraft launch restraint and dispensing structures 100, but is not limited to these embodiments. Although some examples refer to satellites, the spacecrafts are not limited to being satellites. The steps in process 1100 may be performed in a different order than depicted, or may be performed at the same time. Step 1102 includes configuring secondary tie-down mechanisms 128 to hold the spacecrafts 102 radially together. Step 1102 may include pre-tensioning the secondary tie-down rods 128. In one embodiment, each secondary tie-down rod 128 is bolted to a spacecraft 102. In one embodiment, the dispensing structure 100 has a structural central post 104, and the secondary tie-down rods 128 are part of secondary tie-down mechanisms that are attached to the central post 104. In an embodiment, the central post 104 has a number of cups 130, and each satellite 102 has a nose cone 126, which is placed into a cup 130. In one embodiment, the dispensing structure 100 has a non-structural post 704, and the spacecrafts 102 each have a rigid cone 710. The rigid cone 710 of the spacecrafts at a given level of the stack are brought together to form a structure such as depicted in FIG. 7 (the primary tie-down rods 110 are not yet in place, however).

Step 1104 includes configuring primary tie-down mechanisms 119 to hold spacecrafts axially together. Step 1104 may include pre-tensioning the primary tie-down mechanisms 119. FIGS. 4A and 8 depicts examples in which primary tie-down mechanisms 119 hold satellites axially together. As discussed herein each primary tie-down mechanisms 119 may include a primary tie-down rods 110, a clamp 112, and a primary tie-down release mechanism 120. Step 1102 may include configuring these components to hold spacecrafts axially together. Process 1100 may further include securing the dispensing structure 100 to a launch adaptor 106.

Figure 12:
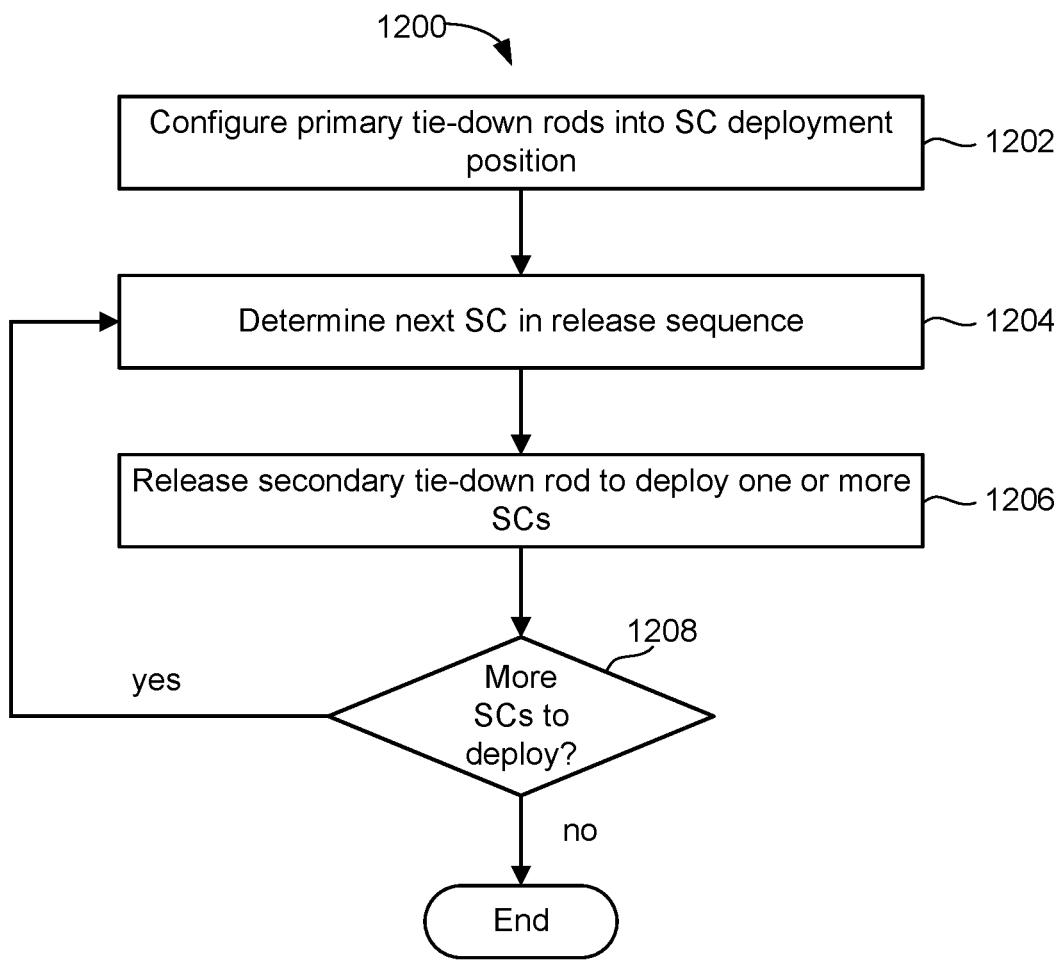
FIG. 12 is a flowchart of one embodiment of a process of dispensing spacecrafts into orbit.

FIG. 12 is a flowchart of one embodiment of a process 1200 of dispensing spacecrafts 102 into orbit. The process will be explained with reference to the various embodiments of spacecraft launch restraint and dispensing structures 100, but is not limited to these embodiments. Although some examples refer to satellites, the spacecrafts are not limited to being satellites. The steps in process 1200 may be performed in a different order than depicted, or may be performed at the same time. In some embodiments, process 1200 is performed under control of a controller (e.g., micro-processor) in the spacecraft. The controller may issue control signals to the primary tie-down release mechanism 120 and to actuators in the secondary tie-down release mechanisms 122.

Step 1202 includes configuring primary tie-down rods 110 into a spacecraft deployment position. In one embodiment, all of the primary tie-down rods 110 are swung out simultaneously into the deployment position. FIGS. 5 and 6 depict an example in which primary tie-down rods 110 are in the spacecraft deployment position. FIGS. 9 and 10 depict another example in which primary tie-down rod 110 are in the spacecraft deployment position. Step 1202 may include positioning all of the primary tie-down rods 110 in the spacecraft deployment position.

Step 1202 may include issuing control signals to the primary tie-down mechanisms 120 to instruct each respective primary tie-down mechanism to unclamp two adjacent stacks of the satellites being clamped by the respective primary tie-down mechanism. Step 1202 may include issuing control signals to the primary tie-down mechanisms 120 to instruct each respective primary tie-down mechanism to move a primary tie-down rod 110 of the respective primary tie-down mechanism 119 from the stowed position to the deployment position.

Step 1204 includes determining a next spacecraft to release in a release sequence. Process 1200 allows the spacecrafts to be deployed in any desired sequence.

Step 1206 includes operating a secondary tie-down release mechanism 122 to deploy one or more spacecrafts. Step 1206 may include issuing control signals to the plurality of secondary tie-down mechanisms 122 to instruct the respective secondary tie-down mechanisms to simultaneously eject two of the satellite from different stacks. FIGS. 5 and 6 depict satellites 102(1)(a) and 102(1)(c) being dispensed (or ejected). The satellites are ejected in the radial direction. In this example, two satellites are ejected simultaneously. FIGS. 9 and 10 depict satellites 102(1)(h) and 102(1)(f) being dispensed (or ejected). Again, the satellites are ejected in the radial direction. In this example, two satellites are ejected simultaneously. Step 1208 includes determining whether there are more spacecrafts to deploy. If so, steps 1204 and 1206 are performed again. After the spacecrafts are deployed ground control may take over the maneuvering of the satellites to place each respective satellite into the desired orbit.

Figure 13:
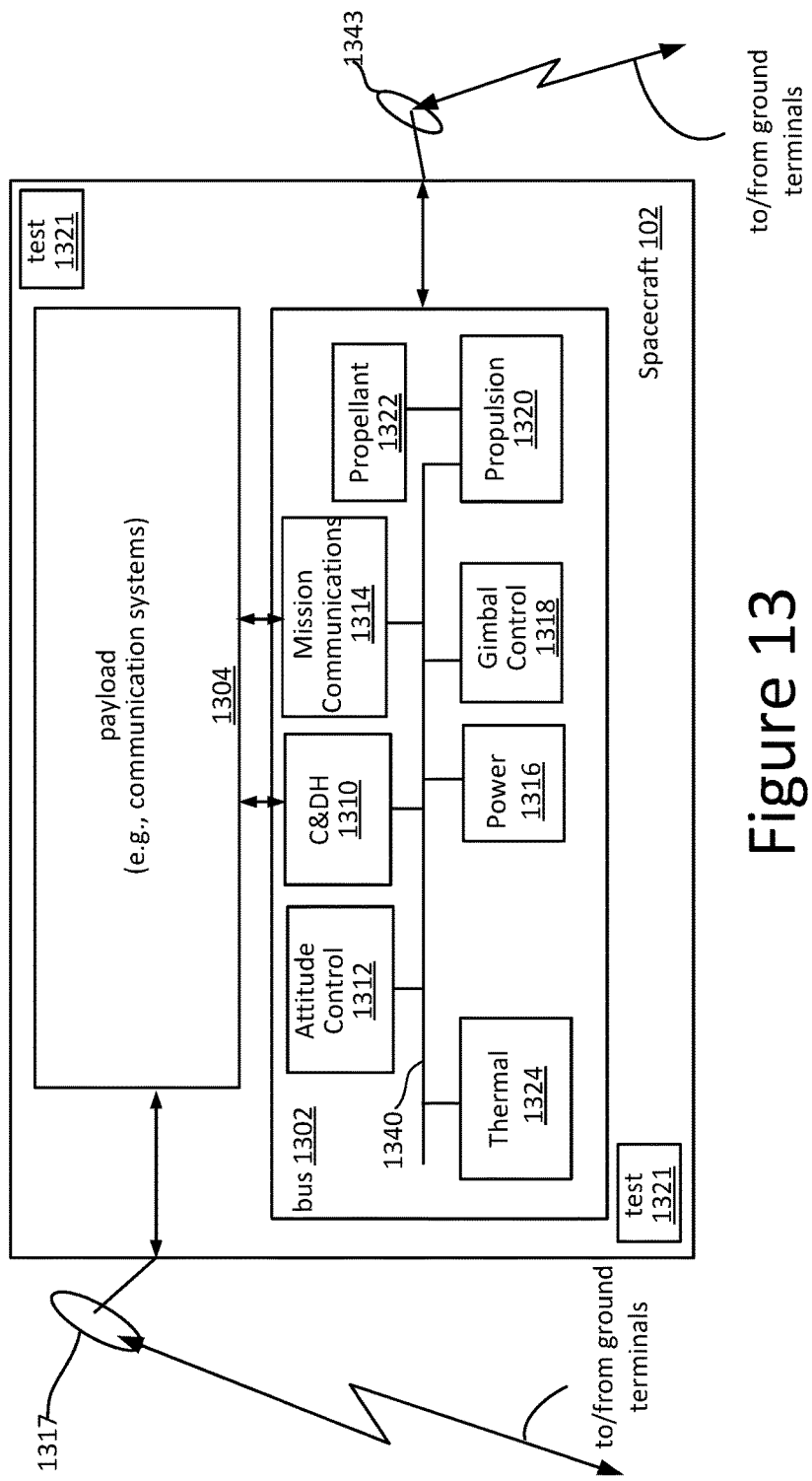
FIG. 13 is a block diagram of an example spacecraft.

FIG. 13 is a block diagram of one embodiment of spacecraft 102, which in one example (as discussed above) is a satellite. In one embodiment, spacecraft 102 includes a bus 1302 and a payload 1304 carried by bus 1302. Some embodiments of spacecraft 102 may include more than one payload. The payload provides the functionality of communication, sensors and/or processing systems needed for the mission of spacecraft 102.

In general, bus 1302 is the spacecraft that houses and carries the payload 1304, such as the components for operation as a communication satellite. The bus 1302 includes a number of different functional sub-systems or modules, some examples of which are shown. Each of the functional sub-systems typically include electrical systems, as well as mechanical components (e.g., servos, actuators) controlled by the electrical systems. These include a command and data handling sub-system (C&DH) 1310, attitude control systems 1312, mission communication systems 1314, power subsystems 1316, gimbal control electronics 1318 that be taken to include a solar array drive assembly, a propulsion system 1320 (e.g., thrusters), propellant 1322 to fuel some embodiments of propulsion system 1320, and thermal control subsystem 1324, all of which are connected by an internal communication network 1340, which can be an electrical bus (a "flight harness") or other means for electronic, optical or RF communication when spacecraft is in operation. Also represented are an antenna 1343, that is one of one or more antennae used by the mission communication systems 1314 for exchanging communications for operating of the spacecraft with ground terminals, and a payload antenna 1317, that is one of one or more antennae used by the payload 1304 for exchanging communications with ground terminals, such as the antennae used by a communication satellite embodiment. The spacecraft can also include a number of test sensors 1321, such as accelerometers that can used when performing test operations on the spacecraft. Other equipment can also be included.

The command and data handling module 1310 includes any processing unit or units for handling includes command control functions for spacecraft 102, such as for attitude control functionality and orbit control functionality. The attitude control systems 1312 can include devices including torque rods, wheel drive electronics, and control momentum gyro control electronics, for example, that are used to monitor and control the attitude of the spacecraft. Mission communication systems 1314 includes wireless communication and processing equipment for receiving telemetry data/commands, other commands from the ground control terminal 30 to the spacecraft and ranging to operate the spacecraft. Processing capability within the command and data handling module 1310 is used to control and operate spacecraft 102. An operator on the ground can control spacecraft 102 by sending commands via ground control terminal 30 to mission communication systems 1314 to be executed by processors within command and data handling module 1310. In one embodiment, command and data handling module 1310 and mission communication system 1314 are in communication with payload 1304. In some example implementations, bus 1302 includes one or more antennae as indicated at 1343 connected to mission communication system 1314 for wirelessly communicating between ground control terminal 30 and mission communication system 1314. Power subsystems 1316 can include one or more solar panels and charge storage (e.g., one or more batteries) used to provide power to spacecraft 102. Propulsion system 1320 (e.g., thrusters) is used for changing the position or orientation of spacecraft 102 while in space to move into orbit, to change orbit or to move to a different location in space. The gimbal control electronics 1318 can be used to move and align the antennae, solar panels, and other external extensions of the spacecraft 102.

In one embodiment, the payload 1304 is for a communication satellite and includes an antenna system (represented by the antenna 1317) that provides a set of one or more beams (e.g., spot beams) comprising a beam pattern used to receive wireless signals from ground stations and/or other spacecraft, and to send wireless signals to ground stations and/or other spacecraft. In some implementations, mission communication system 1314 acts as an interface that uses the antennae of payload 1304 to wirelessly communicate with ground control terminal 30. In other embodiments, the payload could alternately or additionally include an optical payload, such as one or more telescopes or imaging systems along with their control systems, which can also include RF communications to provide uplink/downlink capabilities.

Figure 14:
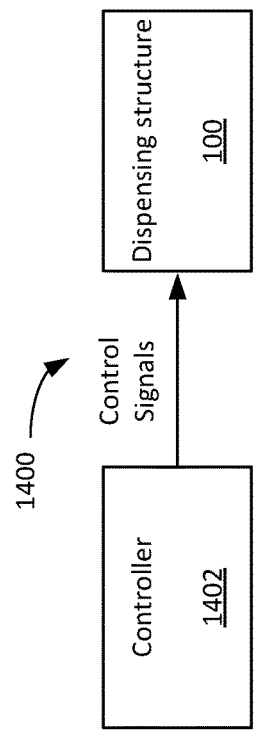
FIG. 14 depicts one embodiment of a system for dispensing spacecrafts.

FIG. 14 depicts one embodiment of a system for dispensing spacecrafts. The system 1400 may be referred to herein as an apparatus. The system 1400 includes a spacecraft launch restraint and dispensing structure 100 and a controller 1402. The controller 1402 issues control signals to the dispensing structure 100 to control operation of the dispensing structure 100.

In an embodiment, the controller 1402 issues control signals to the dispensing structure 100 to implement process 1200. The controller 1402 may be used to control the primary tie-down release mechanisms 120 in order to move the primary tie-downs 110 from the position in which the satellites are axially clamped (see FIGS. 4A, 8) to the deployment position (see FIGS. 5, 9). The controller 1402 may be used to control the secondary tie-down release mechanisms 122 to eject the spacecrafts 102.

The controller 1402 may reside in the launch vehicle, in ground control 30, or in a combination of the launch vehicle and ground control 30. The controller 1402 may comprise hardware and/or software. The controller 1402 could include one or more of a processor (e.g., micro-processor), PGA (Programmable Gate Array, FPGA (Field Programmable Gate Array), ASIC (Application Specific Integrated Circuit), integrated circuit or other type of circuit.

A first embodiment includes an apparatus comprising a central structure around which a plurality of stacks of spacecrafts are grouped. The central structure aligned with a central axis. The apparatus comprises a plurality of primary tie-down mechanisms configured to axially tie-down the plurality of stacks of spacecrafts. Each primary tie-down mechanism has a primary tie-down rod that when in a first position extends from a top to a bottom of two adjacent stacks of the spacecrafts. A pair of the primary tie-down mechanisms clamp a stack of the spacecrafts together axially. Each primary tie-down rod when in a second position extends away from the two adjacent stacks to allow spacecrafts in the two adjacent stacks to be released radially from the central axis. The apparatus comprises a plurality of secondary tie-down mechanisms connected to the central structure. The plurality of secondary tie-down mechanisms comprise a plurality of secondary tie-down rods configured to hold the spacecrafts radially to the central axis both when the primary tie-down rods are in the first position and the second position.

In a second embodiment in furtherance of the first embodiment, the secondary tie-down mechanisms are configured to release the secondary tie-down rods responsive to a control signal in order to radially release the spacecrafts when the primary tie-down rods are in the second position.

In a third embodiment in furtherance of the first or second embodiments, each primary tie-down mechanism comprises a release mechanism configured to release a corresponding primary tie-down rod from the first position to the second position responsive to a control signal.

In a fourth embodiment, in furtherance of any of the first to third embodiments, the central structure comprises a structural post aligned with the central axis. The plurality of secondary tie-down mechanisms are attached to the structural post.

In a fifth embodiment, in furtherance of the fourth embodiment, the structural post comprises a plurality of cups, each cup is configured to receive a cone of one of the spacecrafts to hold the respective spacecraft in place.

In a sixth embodiment, in furtherance of any of the first to third embodiments, the central structure comprises a non-structural post aligned with the central axis, wherein the plurality of secondary tie-down mechanisms are attached to the non-structural post.

In a seventh embodiment, in furtherance of any of the first to sixth embodiments, the apparatus further comprises a launch adaptor. The plurality of primary tie-down mechanisms are configured to tie the spacecrafts to the launch adaptor. The central structure is connected to the launch adaptor.

In an eighth embodiment, in furtherance of any of the first to seventh embodiments, the apparatus further comprises the plurality of stacks of spacecrafts. Each spacecraft comprises a first structural member and a second structural member. A first of the primary tie-down mechanisms when in the first position is configured to pre-tension the first and the second structural members of two stacks of the spacecrafts.

In a ninth embodiment, in furtherance of any of the first to eighth embodiments, the apparatus further comprises the plurality of stacks of spacecrafts. The plurality of stacks of spacecrafts comprise a plurality of levels of spacecrafts. Each spacecraft comprises a rigid cone. One or more of the secondary tie-down rods connect rigid cones of the spacecrafts at each respective level of the stacks such that the spacecrafts at the respective level form a rigid structure.

In a tenth embodiment, in furtherance of any of the first to ninth embodiments, the plurality of stacks of spacecrafts comprise a plurality of levels of spacecrafts. A first of the plurality of secondary tie-down mechanisms further comprises one or more ejection springs connected to the central structure. The one or more ejection springs are configured to radially eject two spacecrafts in different stacks. The two spacecrafts being at the same level of the plurality of stacks of spacecrafts.

In an eleventh embodiment, in furtherance of any of the first to tenth embodiments, the apparatus further comprises a controller configured to issue control signals to the plurality of secondary tie-down mechanisms to simultaneously eject the two spacecrafts at the same level of the plurality of stacks.

One embodiment includes a method of dispensing spacecrafts. The method comprises releasing a plurality of primary tie-down rods from a first position to a second position after launch of a launch vehicle to clear an ejection path for spacecrafts of a plurality of stacks of spacecrafts to be ejected. In the first position each primary tie-down rod extends from a top to a bottom of two adjacent stacks of the spacecrafts. In the first position two of the primary tie-down rods clamp a stack together axially. In the second position each primary tie-down rod extends away from the two adjacent stacks to allow spacecrafts in the two adjacent stacks to be released radially from a central axis. The method comprises releasing each of a plurality of secondary tie-down rods in a release sequence when the primary tie-down rods are in the second position to dispense each of the spacecrafts radially from the central axis in accordance with the release sequence.

One embodiment includes a satellite launch and dispensing system. The system comprises a launch vehicle adaptor configured to connect to a launch vehicle. The system comprises a central structure connected to the launch vehicle adaptor. The system comprises a plurality of stacks of satellites grouped around the central structure. The satellites are arranged in a plurality of layers of multiple satellites. The system comprises a plurality of primary tie-down mechanisms each comprising a primary tie-down rod. Each primary tie-down rod has a first position in which the primary tie-down extends from a top to a bottom of two adjacent stacks of the satellites. In the first position the primary tie-down mechanism axially clamps the two stacks together and holds the two adjacent stacks to the launch vehicle adaptor. Each primary tie-down rod has a second position in which the primary tie-down rod extends away from the two adjacent stacks to allow satellites in the two adjacent stacks to be released radially from the central structure. The system comprises a plurality of secondary tie-down mechanisms connected to the central structure. Each secondary tie-down mechanism is configured to radially hold a respective satellite to the central structure when the primary tie-down rods associated with the respective are in both the first position and in the second position.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope of be defined by the claims appended hereto.

What is claimed is:

1. An apparatus comprising:
a central structure around which a plurality of stacks of spacecrafts are grouped, the central structure aligned with a central axis;
a plurality of primary tie-down mechanisms configured to axially tie-down the plurality of stacks of spacecrafts, each primary tie-down mechanism having a primary tie-down rod and a clamp, the primary tie-down rod that when in a first position extends from a top to a bottom of two adjacent stacks of the spacecrafts with the clamp extending over top surfaces of two adjacent spacecrafts at the top of the two adjacent stacks, wherein a pair of the primary tie-down mechanisms clamp a stack of the spacecrafts together axially, each primary tie-down rod when in a second position extends away from the two adjacent stacks to allow spacecrafts in the two adjacent stacks to be released radially from the central axis; and
a plurality of secondary tie-down mechanisms connected to the central structure, the plurality of secondary tie-down mechanisms comprising a plurality of secondary tie-down rods configured to hold the spacecrafts radially to the central structure both when the primary tie-down rods are in the first position and the second position.

2. The apparatus of claim 1, wherein the secondary tie-down mechanisms are configured to release the secondary tie-down rods responsive to a control signal in order to radially release the spacecrafts when the primary tie-down rods are in the second position.

3. The apparatus of claim 1, wherein each primary tie-down mechanism comprises a release mechanism configured to release a corresponding primary tie-down rod from the first position to the second position responsive to a control signal.

4. The apparatus of claim 1, wherein the central structure comprises a structural post aligned with the central axis, wherein the plurality of secondary tie-down mechanisms are attached to the structural post.

5. The apparatus of claim 4, wherein:
the structural post comprises a plurality of cups, each cup is configured to receive a cone of one of the spacecrafts to hold the respective spacecraft in place.

6. The apparatus of claim 1, wherein the central structure comprises a non-structural post aligned with the central axis, wherein the plurality of secondary tie-down mechanisms are attached to the non-structural post.

7. The apparatus of claim 1, further comprising a launch adaptor, wherein the plurality of primary tie-down mechanisms are configured to tie the spacecrafts to the launch adaptor, wherein the central structure is connected to the launch adaptor.

8. The apparatus of claim 1, further comprising the plurality of stacks of spacecrafts, wherein each spacecraft comprises a first structural member and a second structural member, a first of the primary tie-down mechanisms when in the first position is configured to pre-tension the first and the second structural members of two stacks of the spacecrafts.

9. The apparatus of claim 1, further comprising the plurality of stacks of spacecrafts, wherein:
the plurality of stacks of spacecrafts comprise a plurality of levels of spacecrafts;
each spacecraft comprises a rigid cone; and
one or more of the secondary tie-down rods connect rigid cones of the spacecrafts at each respective level of the stacks such that the spacecrafts at the respective level form a rigid structure, the rigid cones formed from a load bearing material.

10. The apparatus of claim 1, wherein:
the plurality of stacks of spacecrafts comprise a plurality of levels of spacecrafts; and
a first of the plurality of secondary tie-down mechanisms further comprises one or more ejection springs connected to the central structure, the one or more ejection springs configured to radially eject two spacecrafts in different stacks, the two spacecrafts at the same level of the plurality of stacks of spacecrafts.

11. The apparatus of claim 10, further comprising a controller configured to issue control signals to the plurality of secondary tie-down mechanisms to simultaneously eject the two spacecrafts at the same level of the plurality of stacks.

12. A method of dispensing spacecrafts, the method comprising:
releasing a plurality of primary tie-down rods from a first position to a second position after launch of a launch vehicle to clear an ejection path for spacecrafts of a plurality of stacks of spacecrafts to be ejected, wherein in the first position each primary tie-down rod extends from a top to a bottom of two adjacent stacks of the spacecrafts with a clamp extending over top surfaces of two adjacent spacecrafts at the top of the two adjacent stacks, wherein in the first position two of the primary tie-down rods clamp a stack together axially, wherein in the second position each primary tie-down rod extends away from the two adjacent stacks to allow spacecrafts in the two adjacent stacks to be released radially from a central axis; and
releasing each of a plurality of secondary tie-down rods in a release sequence when the primary tie-down rods are in the second position to dispense each of the spacecrafts radially from the central axis in accordance with the release sequence.

13. The method of claim 12, wherein releasing each of the plurality of secondary tie-down rods in a release sequence when the primary tie-down rods are in the second position to dispense each of the spacecrafts radially from the central axis in accordance with the release sequence comprises:
actuating a secondary tie-down release mechanism to simultaneously eject two of the spacecraft from different stacks.

14. The method of claim 12, further comprising:
issuing, by a controller, control signals to actuators connected to the plurality of secondary tie-down rods to instruct the respective actuators to simultaneously eject two of the spacecrafts from different stacks.

15. A satellite launch and dispensing system, the system comprising:
a launch vehicle adaptor configured to connect to a launch vehicle;
a central structure connected to the launch vehicle adaptor;
a plurality of stacks of satellites grouped around the central structure, the satellites arranged in a plurality of layers of multiple satellites;
a plurality of primary tie-down mechanisms each comprising a primary tie-down rod and a clamp, wherein each primary tie-down rod has a first position in which the primary tie-down rod extends from a top to a bottom of two adjacent stacks of the satellites with the clamp extending over top surfaces of two adjacent satellites at the top of the two adjacent stacks, in the first position the primary tie-down mechanism axially clamps the two stacks together and holds the two adjacent stacks to the launch vehicle adaptor, each primary tie-down rod having a second position in which the primary tie-down rod extends away from the two adjacent stacks to allow satellites in the two adjacent stacks to be released radially from the central structure; and
a plurality of secondary tie-down mechanisms connected to the central structure, wherein each secondary tie-down mechanism is configured to radially hold a respective satellite to the central structure when the primary tie-down rods associated with the respective satellite are in both the first position and in the second position.

16. The satellite launch and dispensing system of claim 15, wherein:
each satellite comprises a first structural member and a second structural member, the first structural member configured to provide structural support to the satellite when a first of the primary tie-down rod is in the first position, the second structural member configured to provide structural support to the satellite when a second of the primary tie-down rods is in the first position.

17. The satellite launch and dispensing system of claim 15, further comprising a controller configured to:
issue control signals to the plurality of secondary tie-down mechanisms to instruct the respective secondary tie-down mechanisms to release secondary tie-down rods in order to radially release the satellites when the primary tie-down rods are in the second position.

18. The satellite launch and dispensing system of claim 17, wherein the controller is further configured to:
issue control signals to the primary tie-down mechanisms to instruct each respective primary tie-down mechanism to:
unclamp two adjacent stacks of the satellites being clamped by the respective primary tie-down mechanism; and
move a primary tie-down rod of the respective primary tie-down mechanism from the first position to the second position.

19. The satellite launch and dispensing system of claim 17, wherein the controller is further configured to:
issue control signals to the plurality of secondary tie-down mechanisms to instruct the respective secondary tie-down mechanisms to simultaneously eject two of the satellite from different stacks.

20. The satellite launch and dispensing system of claim 15, wherein:
each satellite comprises a rigid cone; and
the rigid cones of the satellites at each respective level of the stacks are configured to contact each other to provide structural support for the satellites at the respective level, the rigid cones formed from a load bearing material.

* * * * *